(12) United States Patent
Tokunaga

(10) Patent No.: US 9,777,840 B2
(45) Date of Patent: Oct. 3, 2017

(54) SLIDING COMPONENT

(71) Applicant: EAGLE INDUSTRY CO., LTD., Minato-ku, Tokyo (JP)

(72) Inventor: Yuichiro Tokunaga, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 284 days.

(21) Appl. No.: 14/403,529

(22) PCT Filed: Sep. 26, 2013

(86) PCT No.: PCT/JP2013/075969
§ 371 (c)(1),
(2) Date: Nov. 24, 2014

(87) PCT Pub. No.: WO2014/050920
PCT Pub. Date: Apr. 3, 2014

(65) Prior Publication Data
US 2015/0115537 A1    Apr. 30, 2015

(30) Foreign Application Priority Data

Sep. 29, 2012   (JP) ................................ 2012-218911

(51) Int. Cl.
*F16J 15/34*     (2006.01)
*F16J 15/40*     (2006.01)

(52) U.S. Cl.
CPC ............ *F16J 15/34* (2013.01); *F16J 15/348* (2013.01); *F16J 15/3412* (2013.01); *F16J 15/40* (2013.01)

(58) Field of Classification Search
CPC ...... F16J 15/34; F16J 15/3404; F16J 15/3408; F16J 15/3412; F16J 15/342
See application file for complete search history.

(56) References Cited

U.S. PATENT DOCUMENTS 4,406,466 A  *  9/1983  Geary, Jr. ............ F16J 15/3412
                                                          277/347
5,385,409 A  *  1/1995  Ide ....................... F16J 15/3432
                                                          277/400
(Continued)

FOREIGN PATENT DOCUMENTS

CN        2413094 Y       1/2001
FR        1366960 A       7/1964
(Continued)

OTHER PUBLICATIONS

A Second Notification of Reason for Refusal issued by the State Intellectual Property Office of China dated May 30, 2016 for Chinese counterpart application No. 201380027219.4.
(Continued)

*Primary Examiner* — Gilbert Lee
(74) *Attorney, Agent, or Firm* — Law Office of Katsuhiro Arai

(57) ABSTRACT

A sliding component is characterized in that dimples are provided on one sealing face of a pair of sliding parts that mutually slide relative to each other, where the cavitation formation area on the upstream side of each dimple is positioned closer to the low-pressure fluid side and the positive-pressure generation area on the downstream side is positioned closer to the high-pressure fluid side, and the fluid that has been suctioned in the cavitation formation area of each of the above dimples travels in the dimple and is returned to the high-pressure fluid side from the positive-pressure generation area.

11 Claims, 20 Drawing Sheets

(56) References Cited

U.S. PATENT DOCUMENTS

| | | | |
|---|---|---|---|
| 5,447,316 A | 9/1995 | Matsui | |
| 2005/0212217 A1 | 9/2005 | Tejima | |
| 2013/0209011 A1 | 8/2013 | Tokunaga | |
| 2015/0123350 A1* | 5/2015 | Itadani | F16J 15/3424 277/400 |
| 2015/0240950 A1* | 8/2015 | Takahashi | F16J 15/3412 277/377 |

FOREIGN PATENT DOCUMENTS

| | | |
|---|---|---|
| JP | 1993-090049 U | 12/1993 |
| JP | H08-277941 A | 10/1996 |
| JP | H09-273636 A | 10/1997 |
| JP | 2005-180652 A | 7/2005 |
| JP | 2010-133496 A | 6/2010 |
| WO | 2012046749 A1 | 4/2012 |

OTHER PUBLICATIONS

First Notification of Reason for Refusal with Search Report issued by the State Intellectual Property Office of China dated Oct. 23, 2015 for Chinese counterpart application No. 201380027219.4.

Notification of Transmittal of Translation of the International Preliminary Report on Patentability (PCT/IB/338) dated Apr. 9, 2015, with International Preliminary Report on Patentability (PCT/IB/373) and Written Opinion of the International Searching Authority (PCT/ISA/237), for corresponding international application PCT/JP2013/075969.

International Search Report (ISR) dated Dec. 24, 2013, issued for International application No. PCT/JP2013/075969.

A Third Office Action issued by the State Intellectual Property Office of China dated Nov. 23, 2016 for Chinese counterpart application No. 201380027219.4.

* cited by examiner

[FIG. 1]
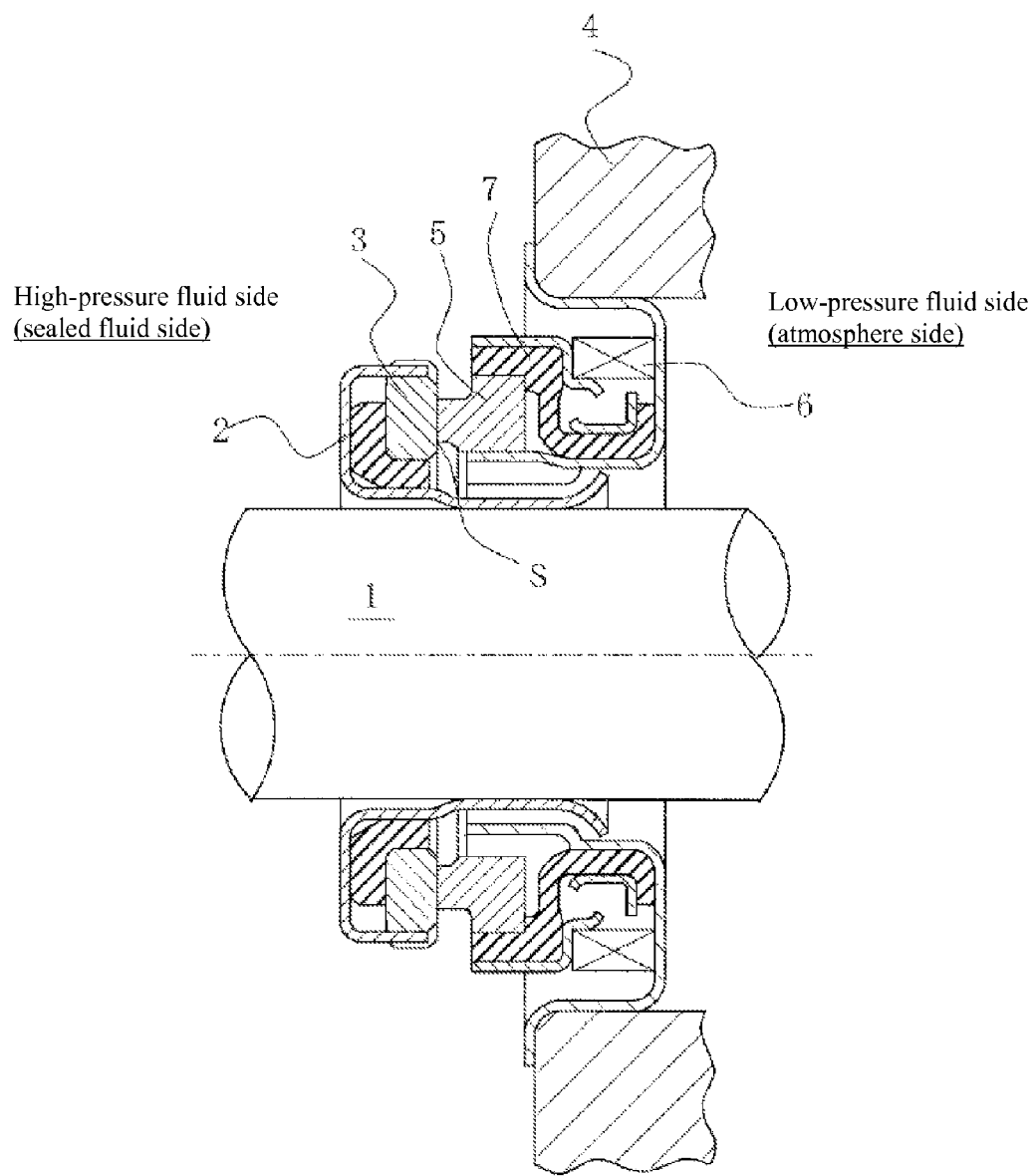
High-pressure fluid side
(sealed fluid side)
Low-pressure fluid side
(atmosphere side)

[FIG. 2]
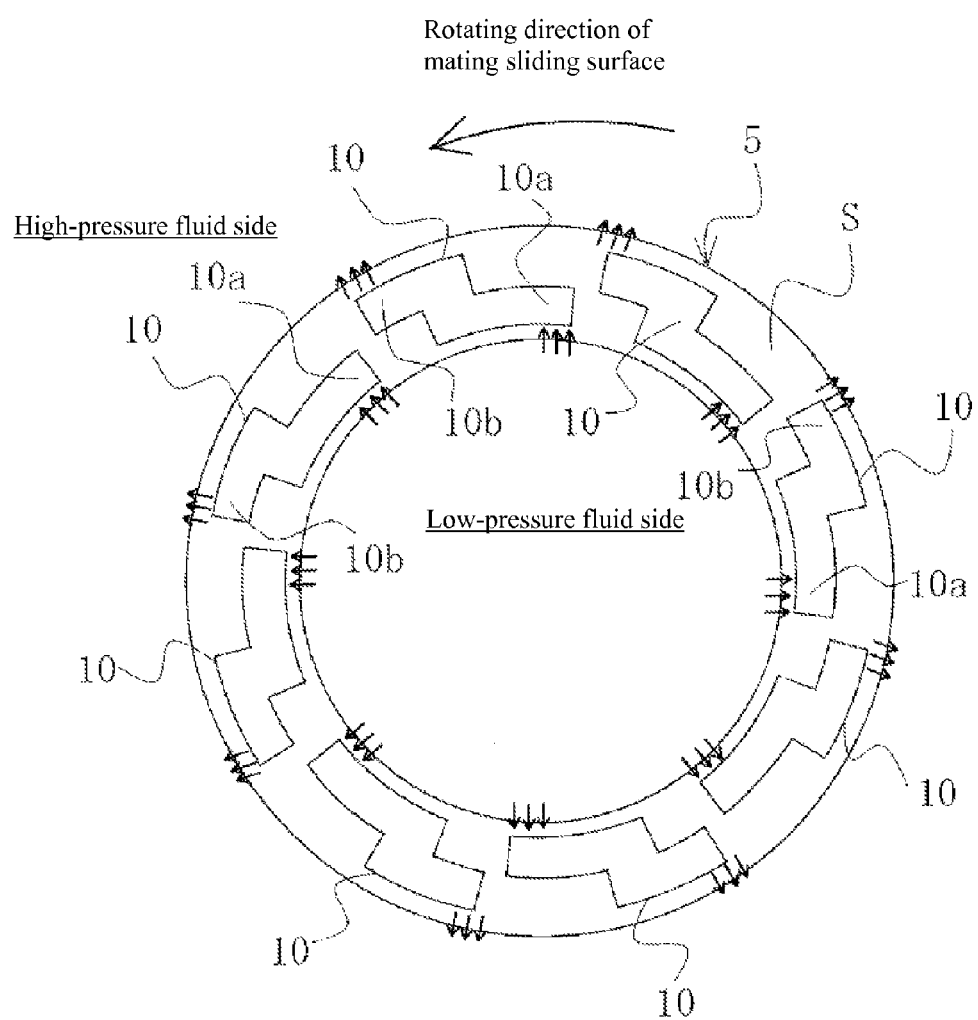

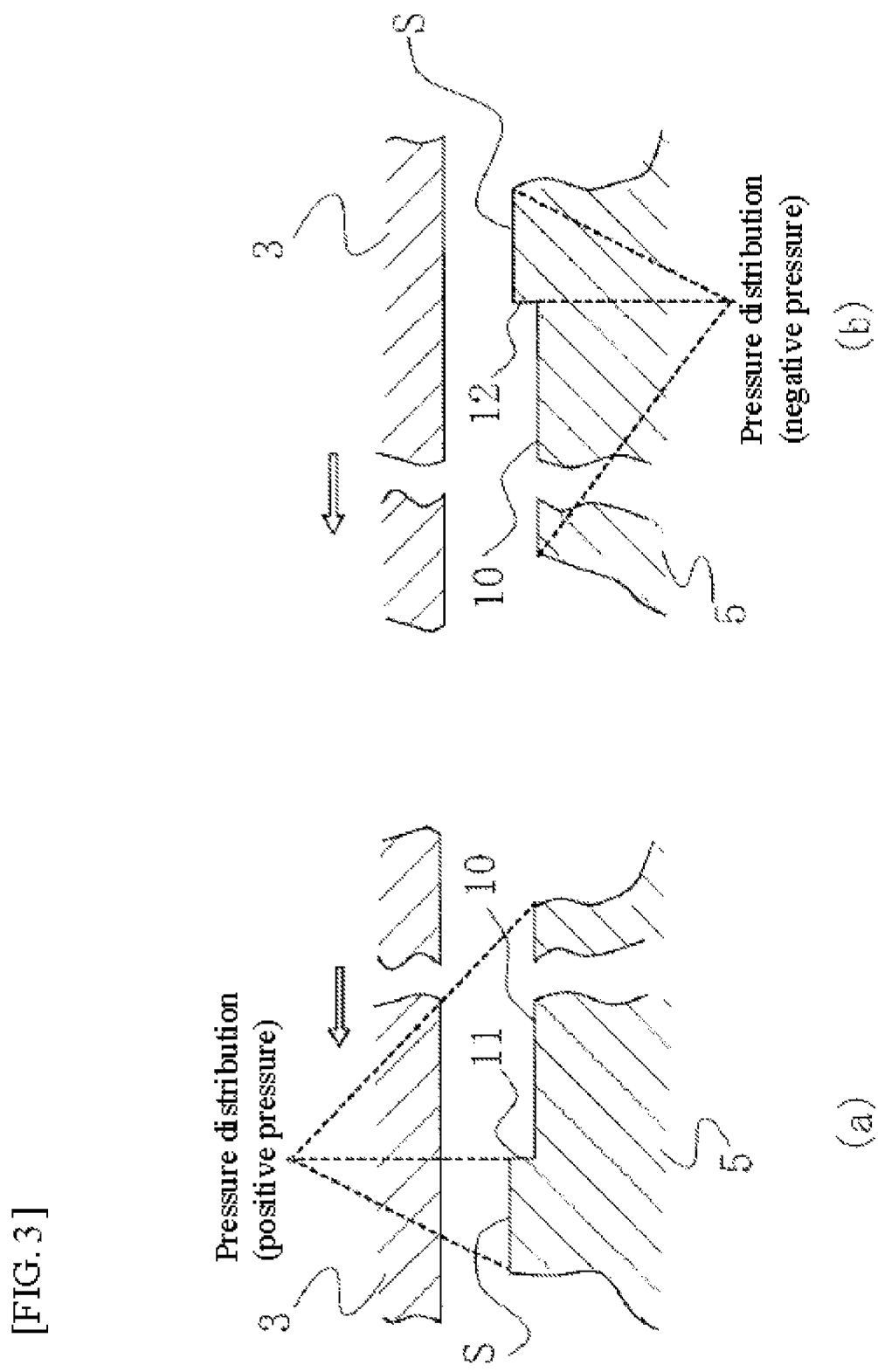
[FIG. 3]

[FIG. 4]
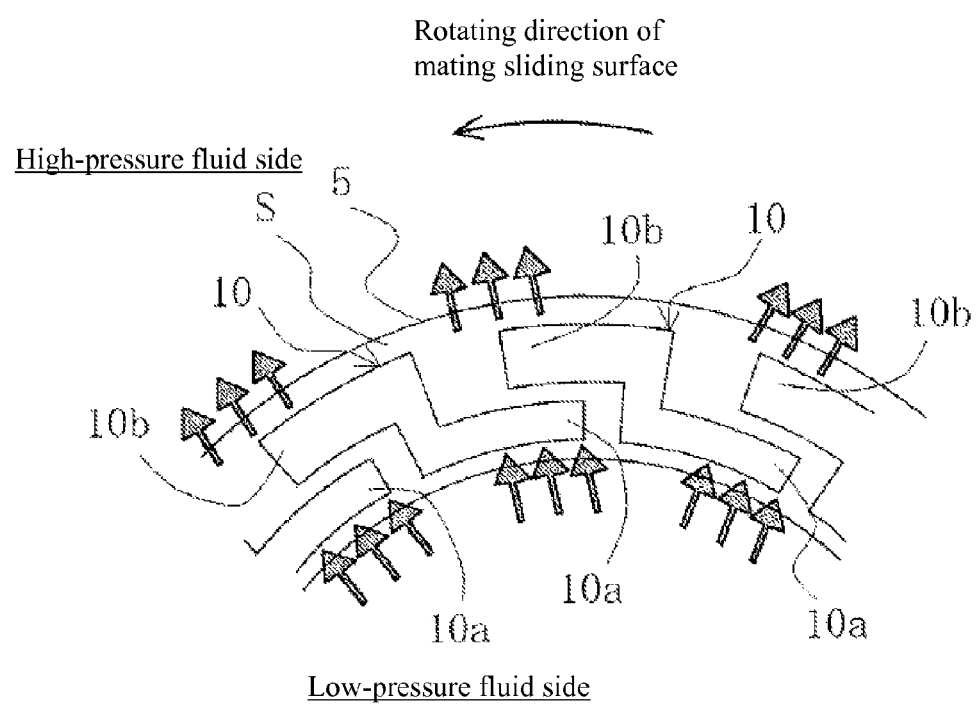

[FIG. 5]
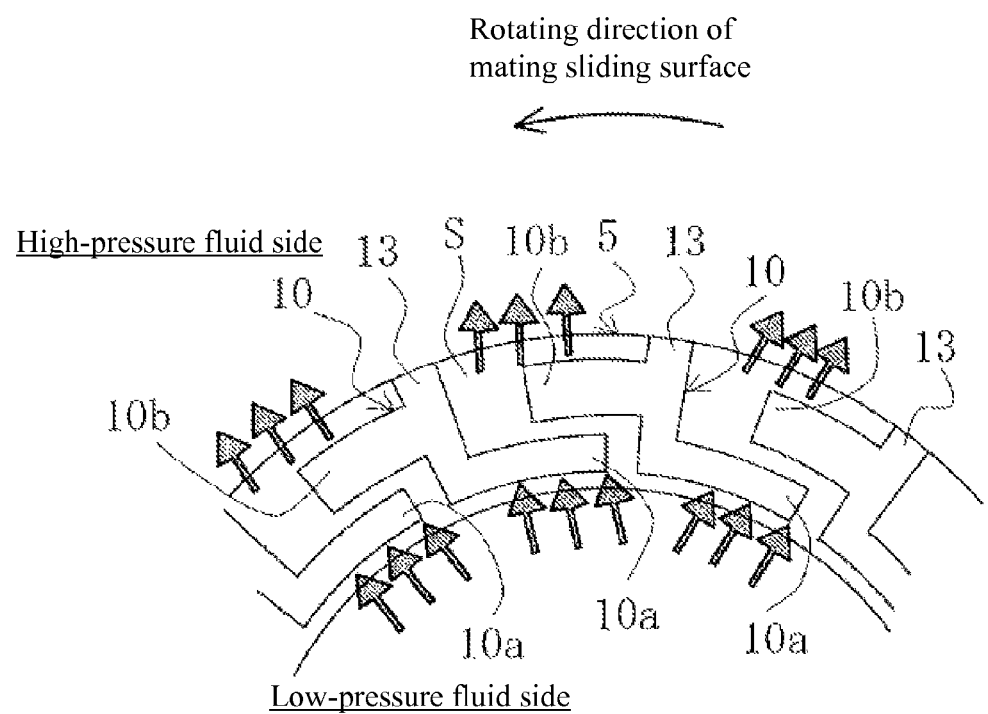

[FIG. 6]
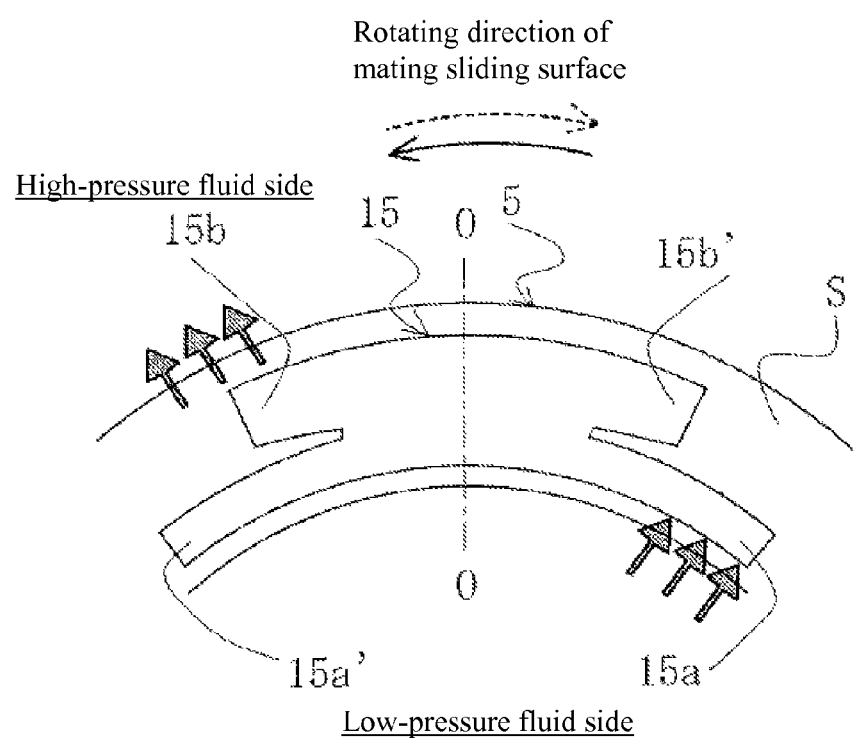

[FIG. 7]
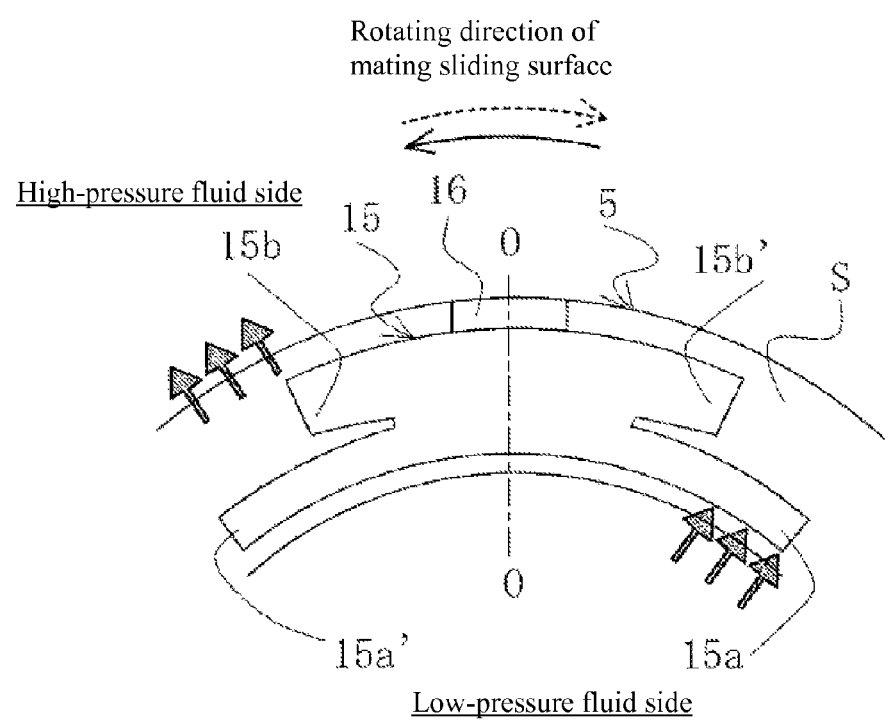

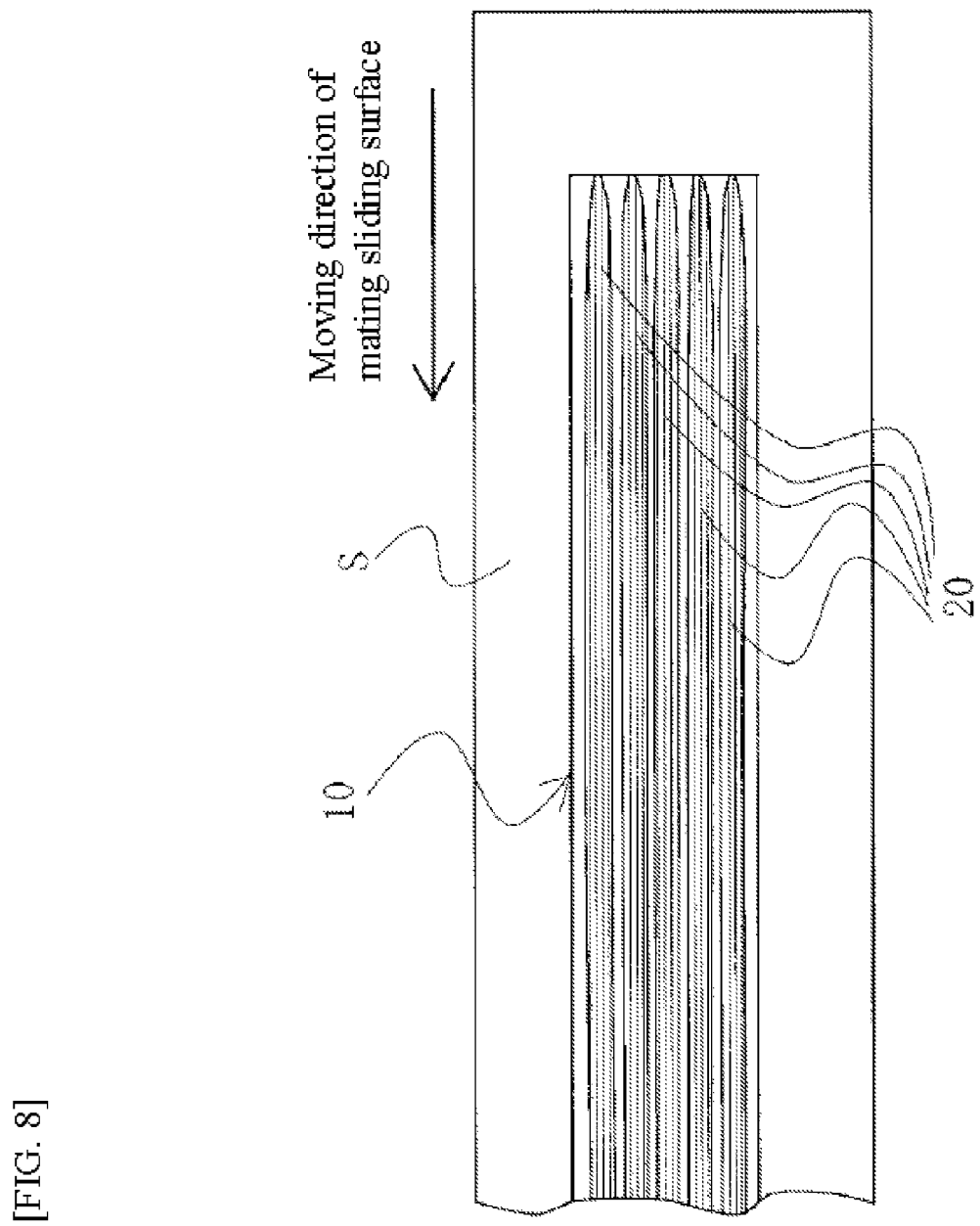
[FIG. 8]

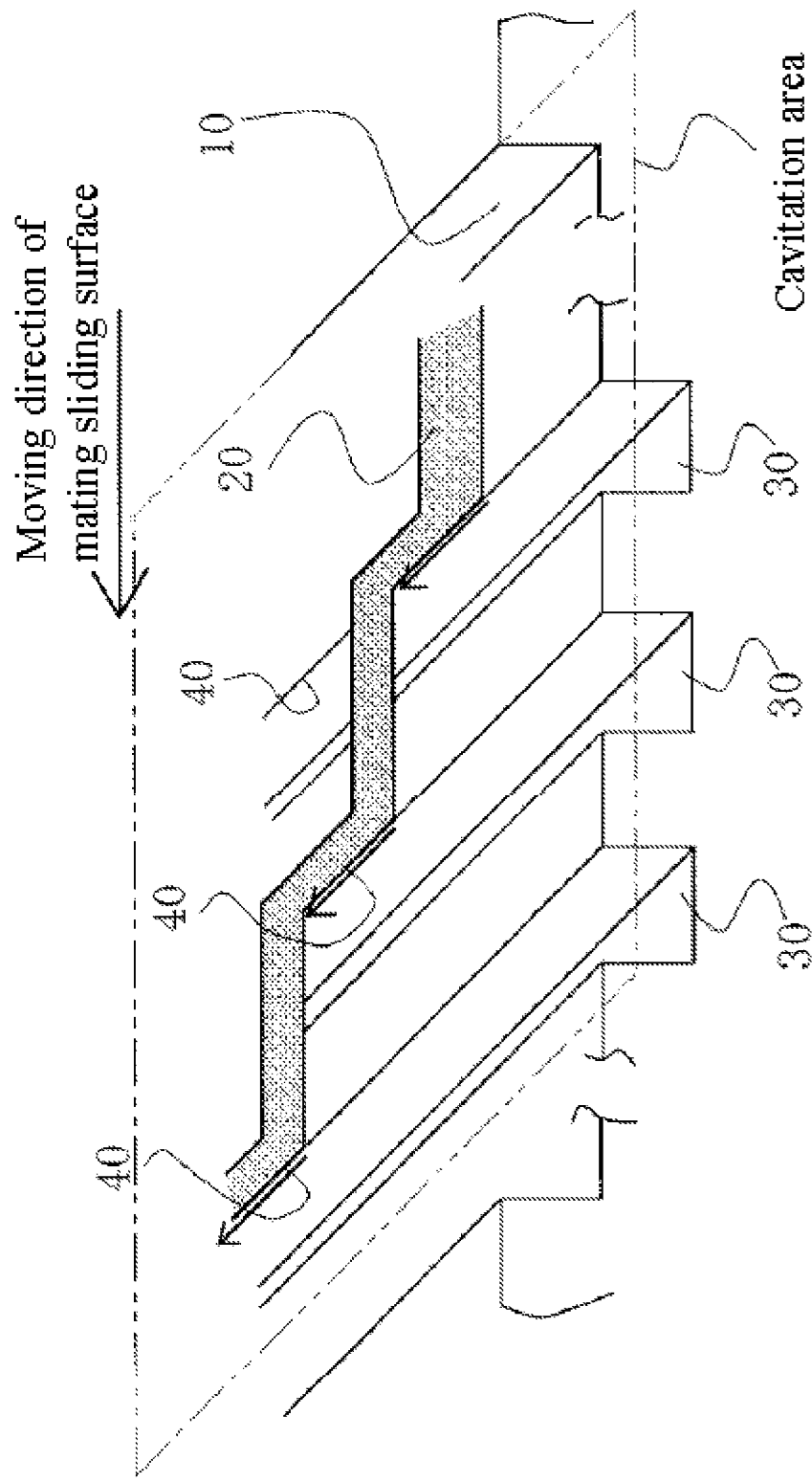
[FIG. 9]

[FIG. 10]
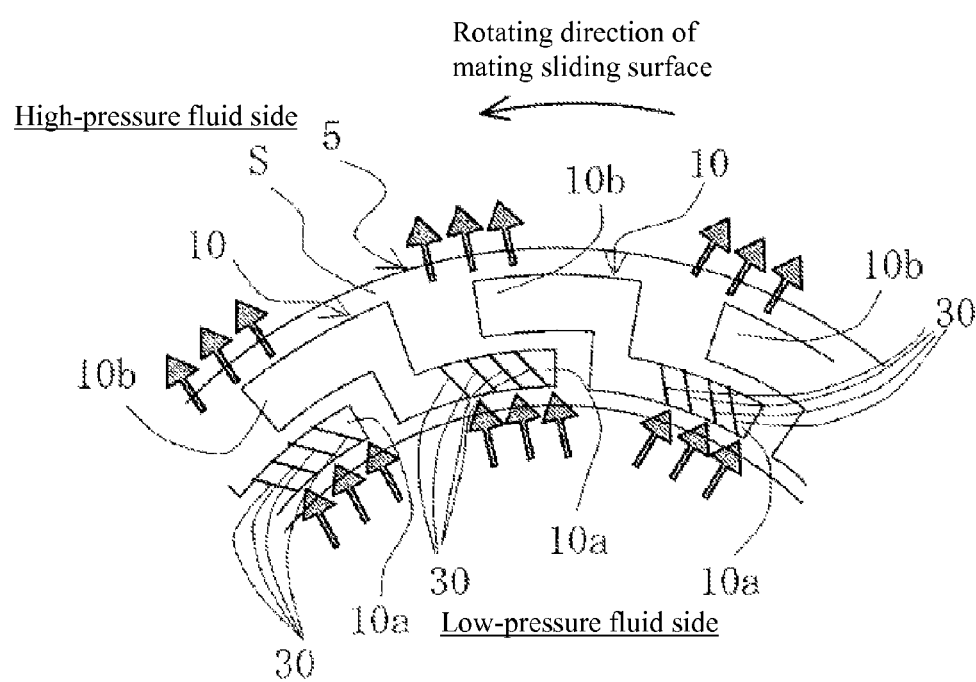

[FIG. 11]
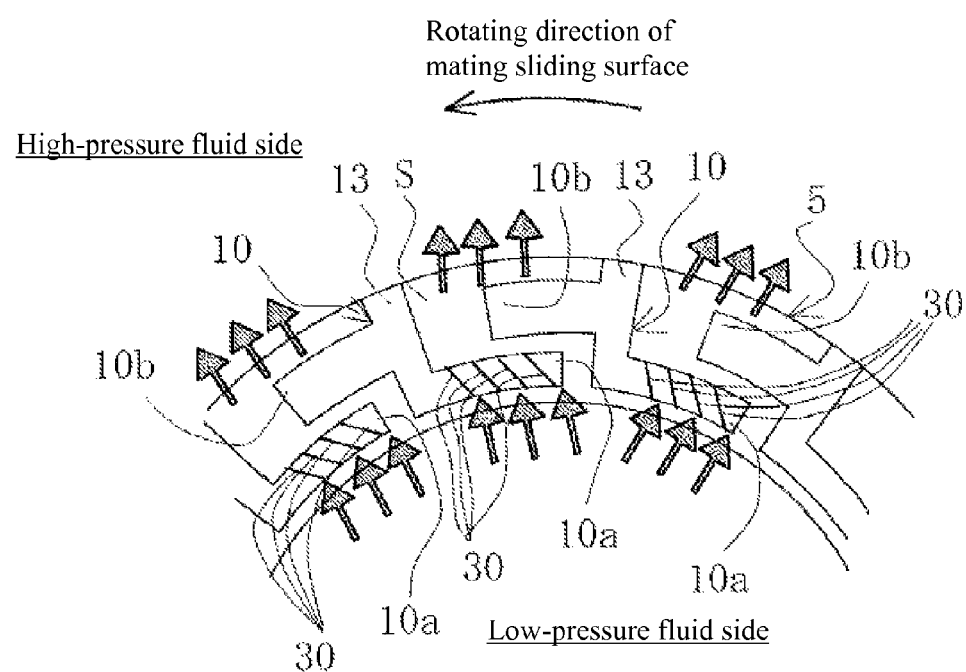

[FIG. 12]
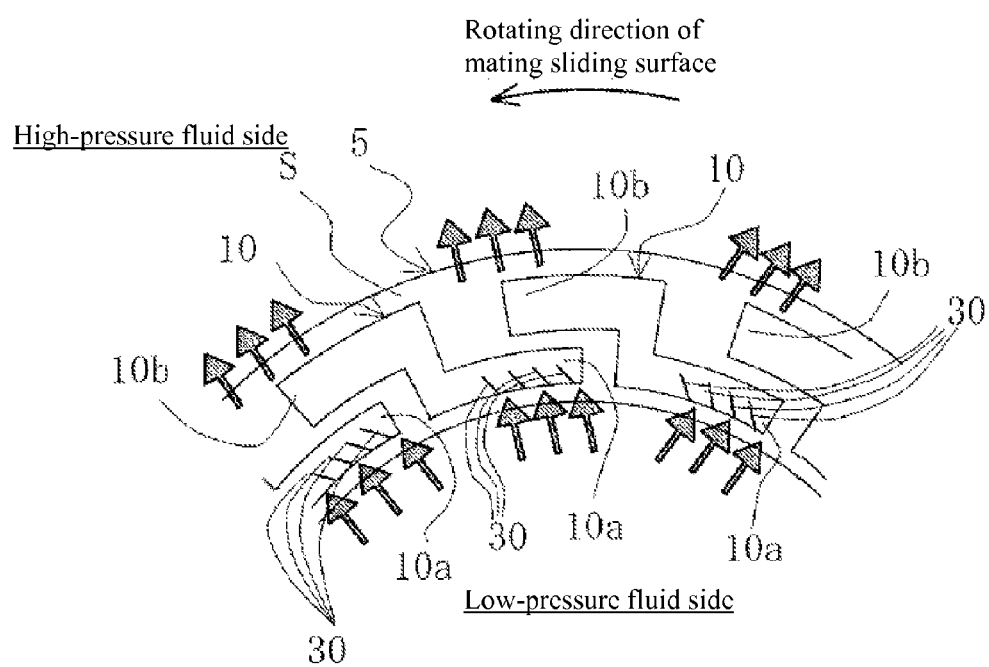

[FIG. 13]
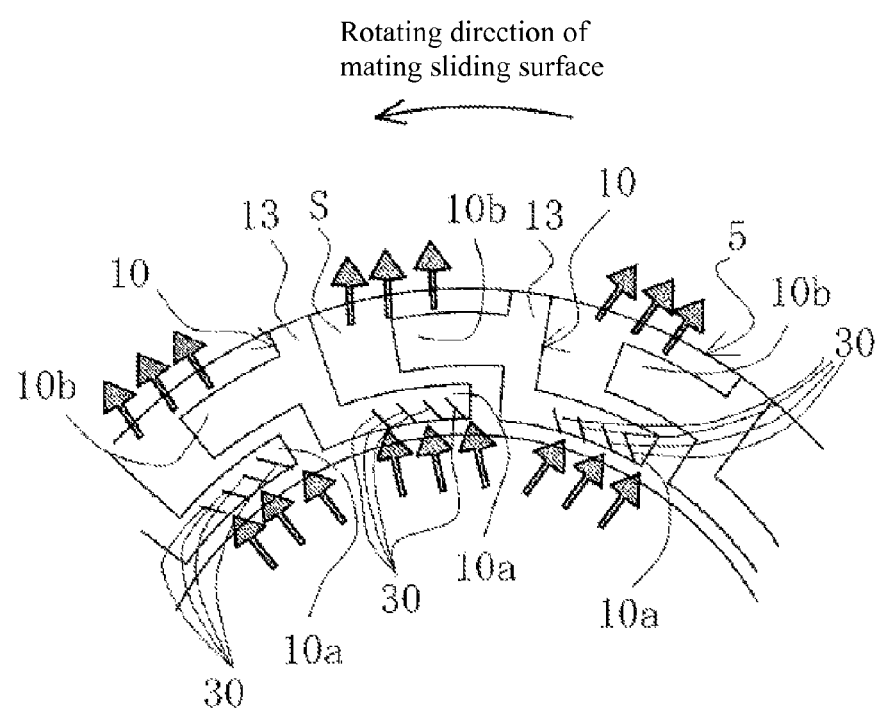

[FIG. 14]
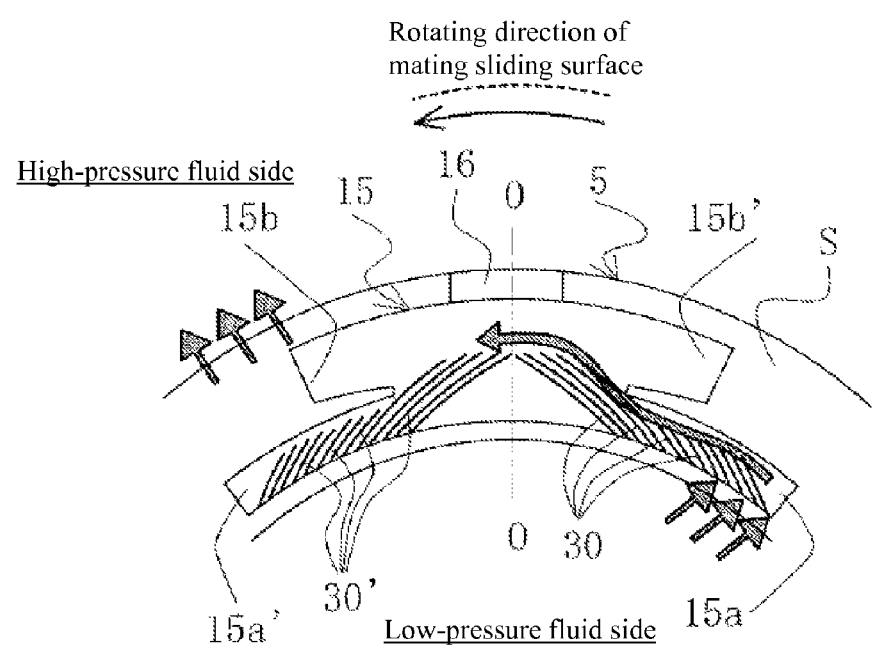

[FIG. 15]
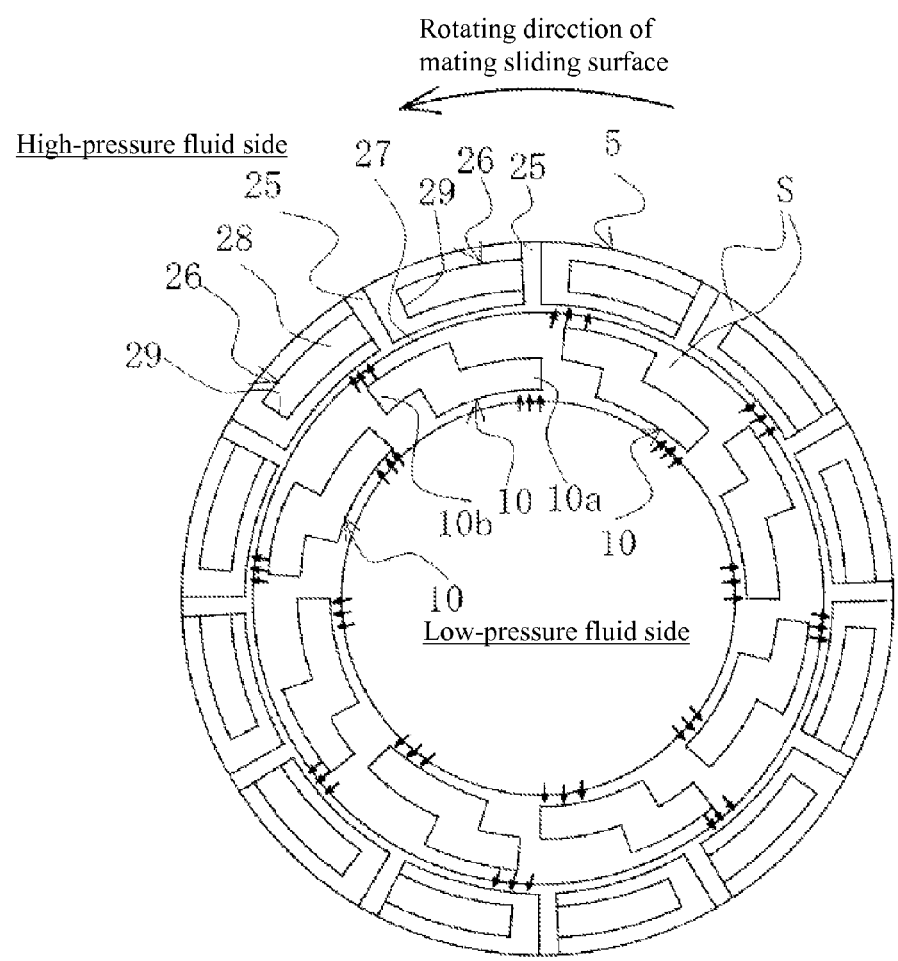

[FIG. 16]
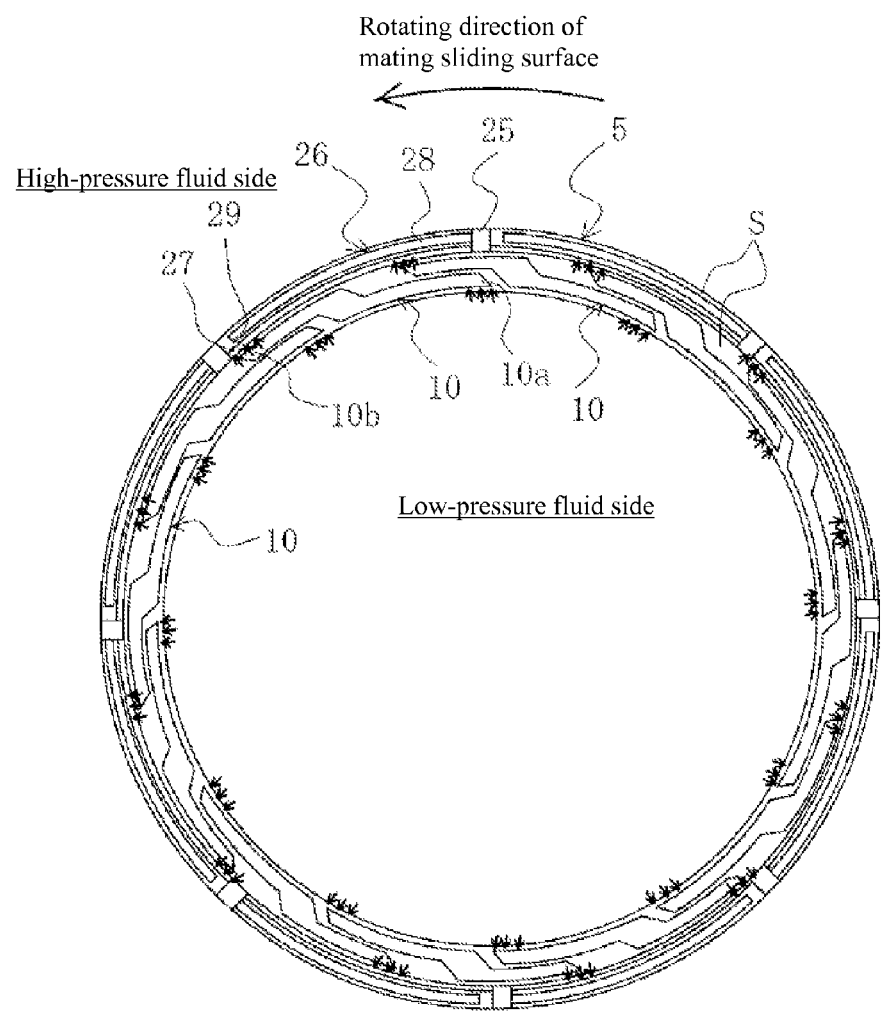

[FIG. 17]
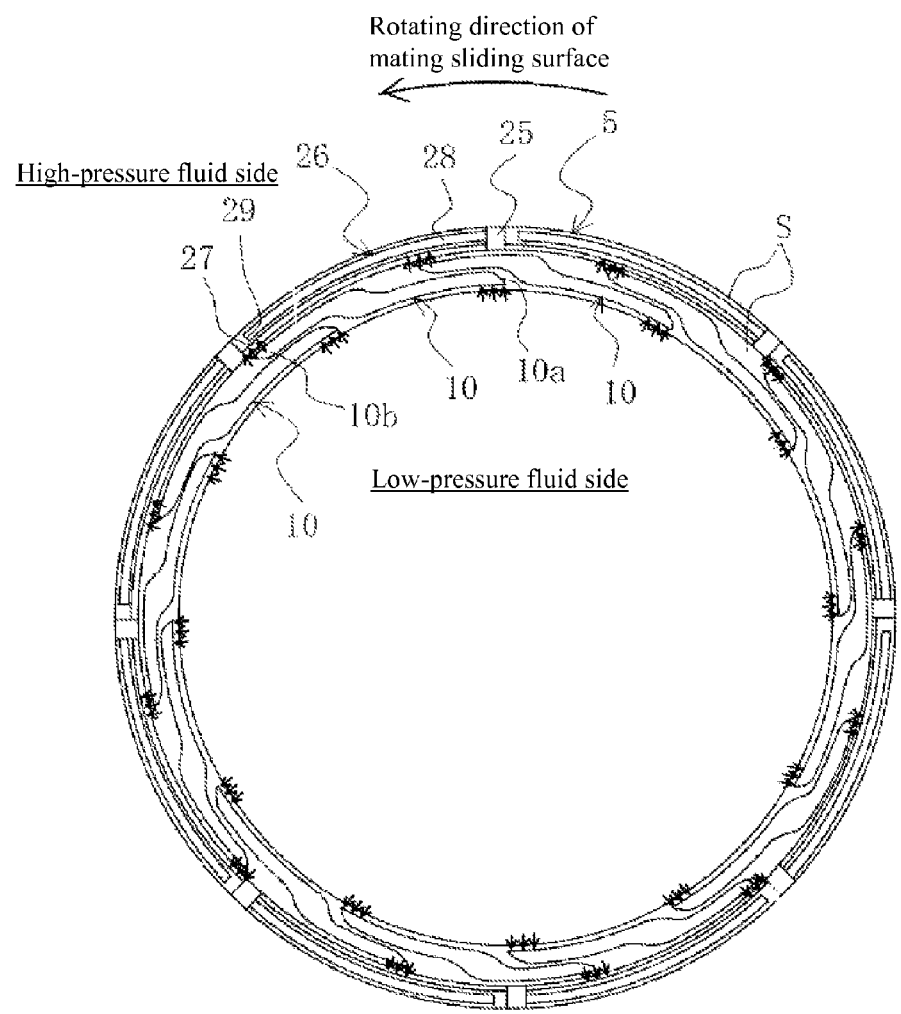

[FIG. 18]
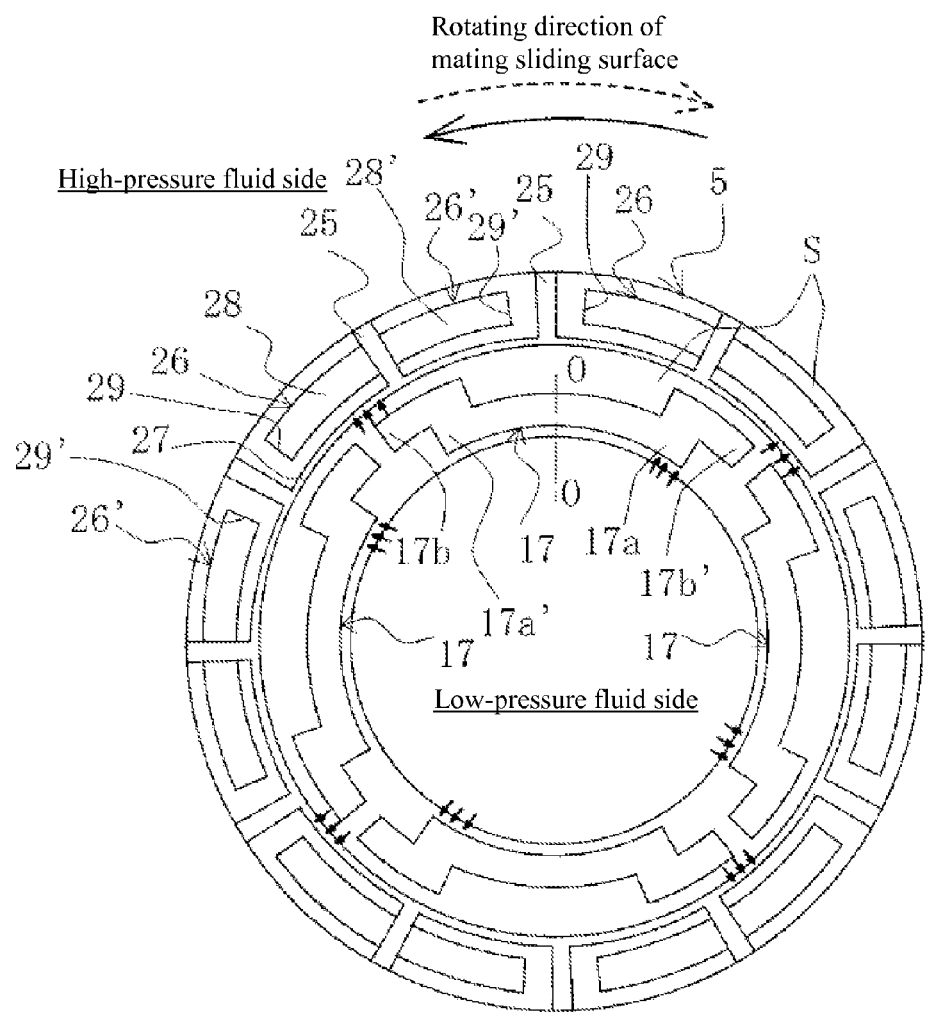

[FIG. 19]
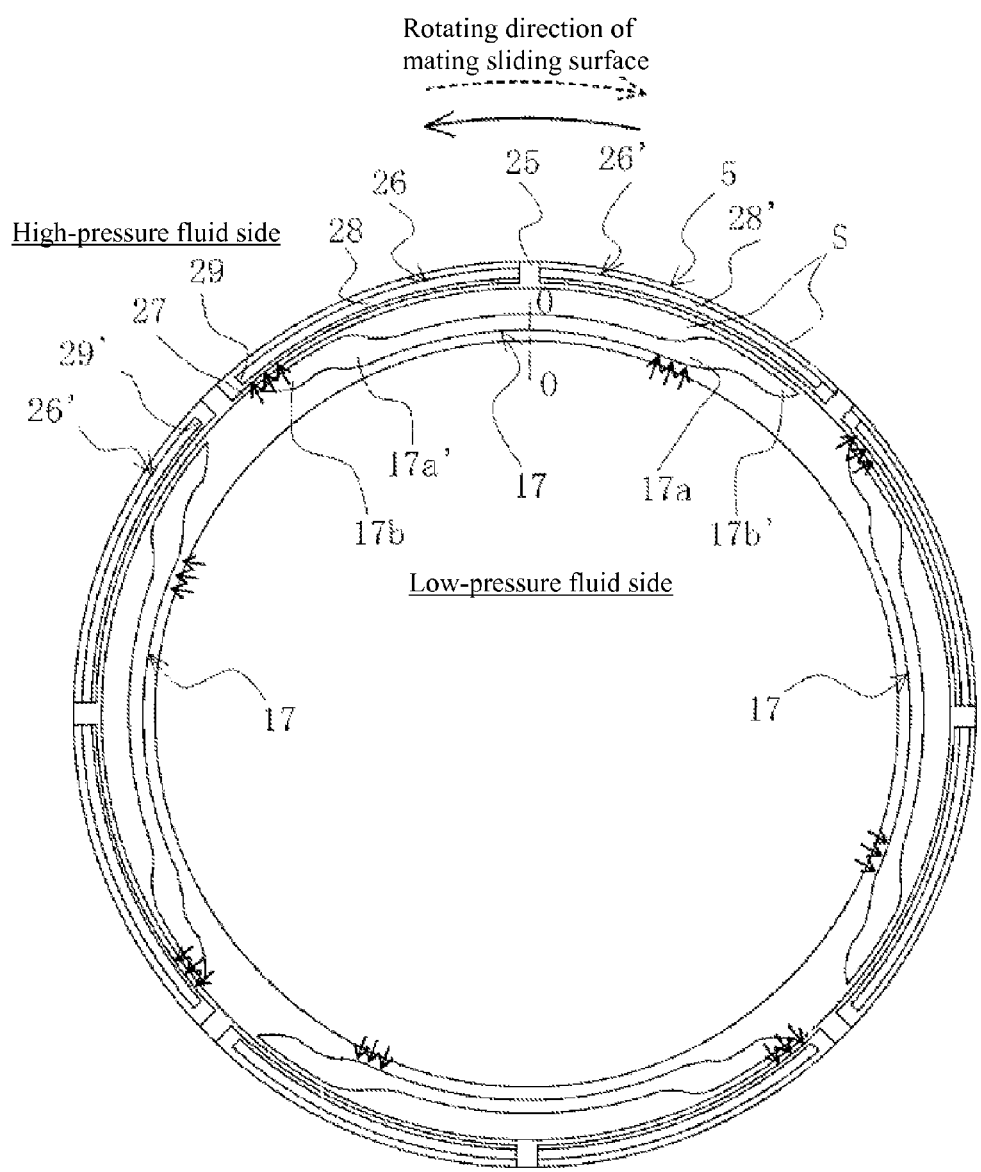

[FIG. 20]
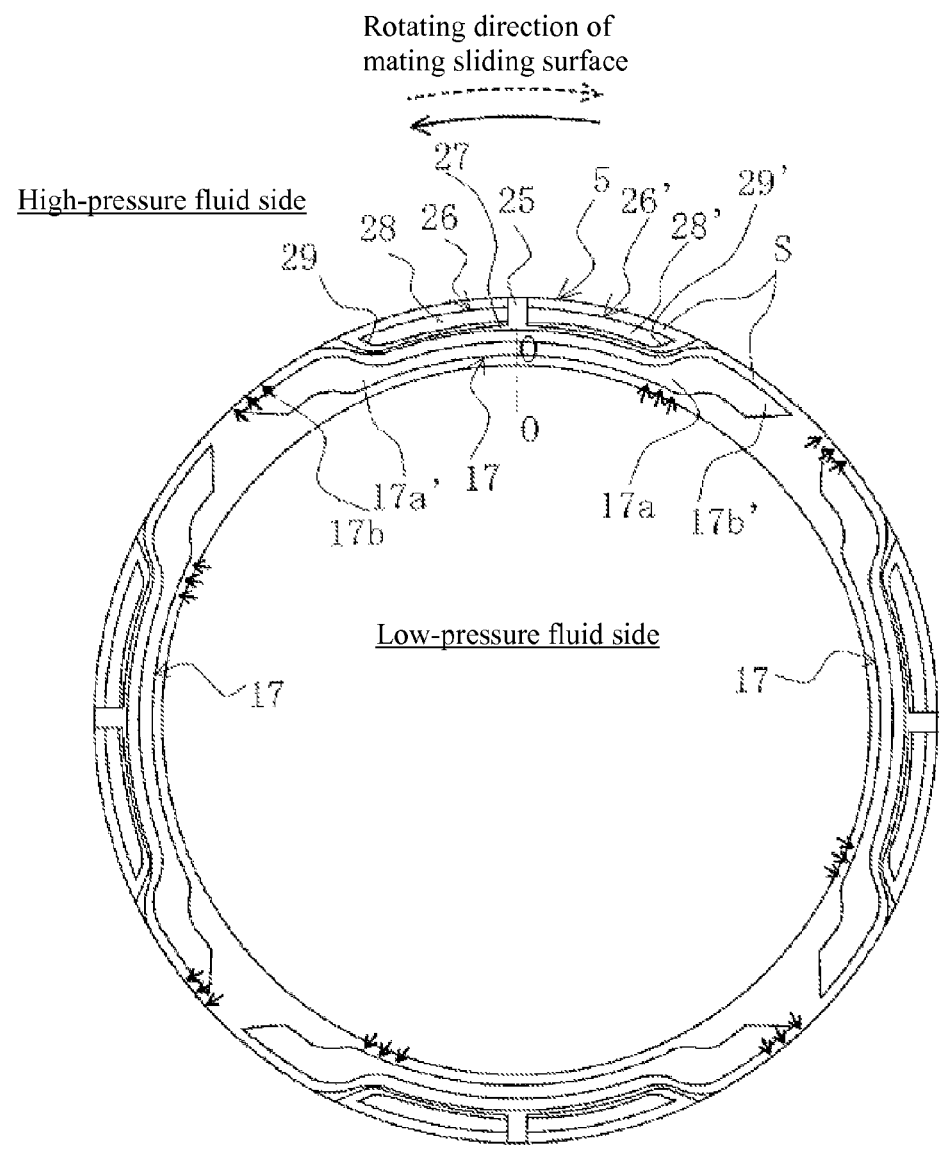

SLIDING COMPONENT

This application is the U.S. National Phase under 35 U.S.C. §371 of International Application PCT/JP2013/075969, filed Sep. 26, 2013, which claims priority to Japanese Patent Application No. 2012-218911, filed Sep. 29, 2012. The International Application was published under PCT Article 21(2) in a language other than English.

TECHNICAL FIELD

The present invention relates to a sliding component suitable for mechanical seals, bearings and other sliding mechanisms, for example. In particular, the present invention relates to a sliding component for seal rings, bearings, etc., that must reduce friction by retaining a fluid on the sealing face and also prevent the fluid from leaking out of the sealing face.

BACKGROUND ART

For a mechanical seal, which is an example of a sliding component, to maintain sealing property for a long period of time, it must satisfy the mutually exclusive conditions of "seal" and "lubricate." Particularly in recent years, the demand for lower friction is increasing further in the area of environmental protection, etc., as a means to prevent the sealed fluid from leaking while reducing mechanical loss at the same time. One way to reduce friction is to generate dynamic pressure between the sealing faces by means of rotation to create the so-called fluid lubrication state where the surfaces slide against each other with a liquid film in between. In this case, however, positive pressure generates between the sealing faces and the fluid flows out of the sealing faces from the part subject to the positive pressure. This is the so-called lateral leak that occurs with bearings and corresponds to how seals leak.

In the case of liquid seal, where the viscosity of the liquid is greater than that of gas, the dynamic pressure effect is achieved between the two surfaces due to their minute undulations and surface irregularities that are present even when both are planes. Accordingly, liquid seal structures are often designed to give priority to sealing performance. On the other hand, however, several mechanisms have been contrived to demonstrate the pumping effect of pulling back the leaked liquid to the high-pressure side in order to seal and lubricate at the same time. For example, Patent Document 1 discloses an invention which is a rotating ring having several spiral grooves on its shaft seal area in the circumferential direction so as to move the fluid toward the high-pressure chamber.

Also among other inventions relating to a sliding component, one invention is known where a suction means is formed on the sealed-fluid side of the sealing face in order to introduce the sealed fluid to the sealing face, and the sealed fluid thus introduced is stored in two dimples formed on the outer periphery side and inner periphery side of the sealing face in the radial direction and separated by a dam, while being pumped into the dimple on the inner periphery side in the radial direction, so as to prevent leakage of the sealed fluid from the seal area positioned on the inner periphery side of the two dimples in the radial direction (refer to Patent Document 2).

However, the invention described in Patent Document 1 above are subject to a pressure difference between the inner periphery and outer periphery of the seal or other sealing face, thus requiring a pumping action to counter the pressure and are potentially unable to push back the fluid depending on the level of this pressure. This creates the problem of inevitable increase of fluid leakage rate when the pressure difference is large, although leakage can be prevented when the pressure difference is small. Also, according to the invention described in Patent Document 2, excessive pumping effect of the dimple on the sealed-fluid side increases the leakage rate, while excessive pumping effect of the dimple on the atmosphere side makes the sealed fluid disappear from the seal area, thereby causing these dimples formed on the seal area to directly contact the sealing face on the mating side to increase the torque. Prior Art 2 presents a problem in that, although the pumping effects of the respective dimples must be balanced in order to prevent the leakage rate from increasing and also prevent the torque from increasing, doing so is quite difficult in reality.

CITATION LIST

Patent Documents

Patent Document 1: Japanese Patent Laid-open No. Hei 8-277941 (Page 5, FIG. 6)

Patent Document 2: Japanese Patent Laid-open No. 2005-180652

SUMMARY OF INVENTION

Technical Problem

One object of the present invention is to provide a sliding component that can prevent leakage while also providing lubrication regardless of the level of differential pressure between the inner periphery and outer periphery of the sealing face by suctioning in the fluid in the cavitation area on the upstream side of the dimple or other concaved part formed on the sealing face (hereinafter referred to as "dimple" in the Specification) and generating positive pressure between the sealing faces on the downstream side of the dimple.

Another object of the present invention is to provide a sliding component that offers a greater function to prevent leakage by controlling the streak-like flow of fluid in the cavitation area.

Solution to Problem

To achieve the aforementioned objects, firstly, the sliding component proposed by the present invention is characterized in that dimples are provided on one sealing face of a pair of sliding parts that mutually slide relative to each other, where the cavitation formation area on the upstream side of each dimple is positioned closer to the low-pressure fluid side and the positive-pressure generation area on the downstream side is positioned closer to the high-pressure fluid side, and the fluid that has been suctioned in from the low-pressure fluid side of the cavitation formation area of each of the above dimples travels in the dimple and is returned to the high-pressure fluid side from the positive-pressure generation area.

According to these features, not only the leakage of the sealed fluid on the high-pressure fluid side to the low-pressure fluid side can be prevented, but a pumping action can also be realized to pull back to the high-pressure fluid side the fluid that has leaked to the low-pressure fluid side, while a fluid lubrication film can be formed on the sealing face due to the positive pressure generated in the positive-pressure generation area, thereby achieving both sealing and lubrication.

Furthermore, secondly, the sliding component proposed by the present invention is characterized, in addition to the first features, in that, with respect to the dimples arranged adjacent to each other in the circumferential direction, the positive-pressure generation area of the dimple positioned on the upstream side is provided in a manner overlapping, in the radial direction, with the cavitation formation area of the dimple positioned on the downstream side.

According to these features, the fluid that tends to leak from the positive-pressure generation area to the low-pressure fluid side and fluid that has leaked to the low-pressure fluid side will be suctioned into the cavitation formation area, thereby further preventing leakage to the low-pressure fluid side.

Furthermore, thirdly, the sliding component proposed by the present invention is characterized, in addition to the first or second features, in that the positive-pressure generation area of the dimple communicates with the high-pressure fluid side via a continuous groove whose depth is equal to or greater than the depth of the dimple.

According to these features, fluid is taken into the positive-pressure generation area not only from the cavitation formation area, but also from the high-pressure fluid side, which augments the lubrication action further.

Furthermore, fourthly, the sliding component proposed by the present invention is characterized, in addition to the first features, in that, of the pair of sliding parts, the sliding part on the rotating side that rotates in both forward and reverse directions is such that the cavitation formation area and positive-pressure generation area are provided symmetrically with each other across a line drawn in the radial direction by connecting the center of the dimple in the circumferential direction and the center of rotation.

According to these features, the sliding ring on the stationary side need not be replaced even when the sliding ring on the rotating side rotates in both forward and reverse directions, thereby achieving both sealing and lubrication.

Furthermore, fifthly, the sliding component proposed by the present invention is characterized, in addition to the third features, in that, of the pair of sliding parts, the sliding part on the rotating side that rotates in both forward and reverse directions is such that the continuous groove is provided symmetrically across a line drawn in the radial direction by connecting the center of the dimple in the circumferential direction and the center of rotation.

According to these features, fluid is taken into the positive-pressure generation area not only from the cavitation formation area, but also from the high-pressure fluid side, on the sliding part whose sliding ring on the rotating side rotates in both forward and reverse directions, which augments the lubrication action further.

Furthermore, sixthly, the sliding component proposed by the present invention is characterized, in addition to any of the first through fifth features, in that grooves with directionality are provided in the cavitation formation area.

According to these features, not only the leakage of the sealed fluid on the high-pressure fluid side to the low-pressure fluid side can be prevented, but a fluid lubrication film is formed on the sealing face due to the positive pressure generated in the positive-pressure generation area to achieve lubrication on the sealing face, while at the same time the grooves with directionality provided in the cavitation formation area control the streak-like flow of fluid in the cavitation formation area to move to the positive-pressure generation area, and consequently leakage of fluid is further prevented.

Furthermore, seventhly, the sliding component proposed by the present invention is characterized, in addition to the sixth features, in that the grooves with directionality are provided at least on the low-pressure fluid side of the cavitation formation area.

According to these features, the sliding component that prevents leakage of fluid further is suitable when the differential pressure between the low-pressure fluid side and high-pressure fluid side is small.

Furthermore, eighthly, the sliding component proposed by the present invention is characterized, in addition to the first or second features, in that: positive-pressure generation mechanisms, each constituted by a Rayleigh step and communicating with the high-pressure fluid side via radius-direction grooves, are provided on the high-pressure fluid side of the sealing face on which the dimples are provided or on the high-pressure fluid side of the other sealing face; the dimples are provided on the low-pressure fluid side; a pressure-release groove is provided between the positive-pressure generation mechanisms and dimples; and the pressure-release groove communicates with the high-pressure fluid side via the radius-direction grooves.

According to these features, the sliding component that lubricates by forming a fluid film via the positive-pressure generation mechanism constituted by the Rayleigh step provided on the high-pressure fluid side, while sealing and lubricating by means of the dimple provided on the low-pressure fluid side, makes the sealing action of the dimple reliable because the fluid suctioned in the cavitation formation area of the dimple is guided from the positive-pressure generation area to the pressure-release groove and returned to the high-pressure fluid side via the radius-direction grooves.

Furthermore, ninthly, the sliding component proposed by the present invention is characterized, in addition to the fourth features, in that positive-pressure generation mechanisms, each constituted by a Rayleigh step and communicating with the high-pressure fluid side via radius-direction grooves, are provided on the high-pressure fluid side of the sealing face on which the dimples are provided or on the high-pressure fluid side of the other sealing face; the dimples are provided on the low-pressure fluid side; a pressure-release groove is provided between the positive-pressure generation mechanisms and dimples; and the pressure-release groove communicates with the high-pressure fluid side via the radius-direction grooves.

According to these features, the sliding component that lubricates by forming a fluid film via the positive-pressure generation mechanism constituted by the Rayleigh step provided on the high-pressure fluid side, while sealing and lubricating by means of the dimple provided on the low-pressure fluid side, makes the sealing action of the dimple reliable and, in addition to this sealing benefit, the sliding ring on the stationary side need not be replaced even when the sliding ring on the rotating side rotates in both forward and reverse directions.

Advantageous Effects of Invention

The present invention offers excellent effects as described below:

(1) The cavitation formation area on the upstream side of each dimple is positioned closer to the low-pressure fluid side and the positive-pressure generation area on the downstream side is positioned closer to the high-pressure fluid side, and the fluid suctioned in the cavitation formation area of each dimple travels in the dimple and is returned to the high-pressure fluid side from the positive-pressure generation area, and accordingly not only the leakage of the sealed fluid on the high-pressure fluid side to the low-pressure fluid side can be prevented, but a pumping action can also be realized to pull back to the high-pressure fluid side the fluid that has leaked to the low-pressure fluid side, while a fluid lubrication film can be formed on the sealing face due to the positive pressure generated in the positive-pressure generation area, thereby achieving both sealing and lubrication.

(2) With respect to the dimples arranged adjacent to each other in the circumferential direction, the positive-pressure generation area of the dimple positioned on the upstream side is provided in a manner overlapping, in the radial direction, with the cavitation formation area of the dimple positioned on the downstream side, and accordingly the fluid that tends to leak from the positive-pressure generation area to the low-pressure fluid side and fluid that has leaked to the low-pressure fluid side will be suctioned into the cavitation formation area, thereby further preventing leakage to the low-pressure fluid side.

(3) The positive-pressure generation area of the dimple communicates with the high-pressure fluid side via a continuous groove whose depth is equal to or greater than the depth of the dimple, and accordingly fluid is taken into the positive-pressure generation area not only from the cavitation formation area, but also from the high-pressure fluid side, which augments the lubrication action further.

(4) The sliding part on the rotating side that rotates in both forward and reverse directions is such that the cavitation formation area and positive-pressure generation area are provided symmetrically with each other across a line drawn in the radial direction by connecting the center of the dimple in the circumferential direction and the center of rotation, and accordingly the sliding ring on the stationary side need not be replaced even when the sliding ring on the rotating side rotates in both forward and reverse directions, thereby achieving both sealing and lubrication.

(5) The sliding part on the rotating side that rotates in both forward and reverse directions is such that the continuous groove is provided symmetrically across a line drawn in the radial direction by connecting the center of the dimple in the circumferential direction and the center of rotation, and accordingly fluid is taken into the positive-pressure generation area not only from the cavitation formation area, but also from the high-pressure fluid side, on the sliding part whose sliding ring on the rotating side rotates in both forward and reverse directions, which further augments the lubrication action.

(6) Grooves with directionality are provided in the cavitation formation area, and accordingly not only the leakage of the sealed fluid on the high-pressure fluid side to the low-pressure fluid side can be prevented, but a fluid lubrication film is formed on the sealing face due to the positive pressure generated in the positive-pressure generation area to achieve lubrication on the sealing face, while at the same time the grooves with directionality provided in the cavitation formation area control the streak-like flow of fluid in the cavitation formation area to move to the positive-pressure generation area, and consequently leakage of fluid is further prevented.

(7) The grooves with directionality are provided at least on the low-pressure fluid side of the cavitation formation area, and accordingly the sliding component that prevents further leakage of fluid is suitable when the differential pressure between the low-pressure fluid side and high-pressure fluid side is small.

(8) On the sliding component whose cavitation formation area on the upstream side of the dimple is positioned closer to the low-pressure fluid side and whose positive-pressure generation area on the downstream side is positioned closer to the high-pressure fluid side; positive-pressure generation mechanisms, each constituted by a Rayleigh step and communicating with the high-pressure fluid side via radius-direction grooves, are provided on the high-pressure fluid side of the sealing face on which the dimples are provided or on the high-pressure fluid side of the other sealing face; the dimples are provided on the low-pressure fluid side; a pressure-release groove is provided between the positive-pressure generation mechanisms and dimples; and the pressure-release groove communicates with the high-pressure fluid side via the radius-direction grooves; and accordingly, the sliding component that lubricates by forming a fluid film via the positive-pressure generation mechanism constituted by the Rayleigh step provided on the high-pressure fluid side, while sealing and lubricating by means of the dimple provided on the low-pressure fluid side, makes the sealing action of the dimple reliable because the fluid suctioned in the cavitation formation area of the dimple is guided from the positive-pressure generation area to the pressure-release groove and returned to the high-pressure fluid side via the radius-direction grooves.

(9) On the sliding part on the rotating side that rotates in both forward and reverse directions, where the cavitation formation area and positive-pressure generation area are provided symmetrically with each other across a line drawn in the radial direction by connecting the center of the dimple in the circumferential direction and the center of rotation; positive-pressure generation mechanisms, each constituted by a Rayleigh step and communicating with the high-pressure fluid side via radius-direction grooves, are provided on the high-pressure fluid side of the sealing face on which the dimples are provided or on the high-pressure fluid side of the other sealing face; the dimples are provided on the low-pressure fluid side; a pressure-release groove is provided between the positive-pressure generation mechanisms and dimples; and the pressure-release groove communicates with the high-pressure fluid side via the radius-direction grooves; and accordingly, the sliding component that lubricates by forming a fluid film via the positive-pressure generation mechanism constituted by the Rayleigh step provided on the high-pressure fluid side, while sealing and lubricating by means of the dimple provided on the low-pressure fluid side, makes the sealing action of the dimple reliable and, in addition to this sealing benefit, the sliding ring on the stationary side need not be replaced even when the sliding ring on the rotating side rotates in both forward and reverse directions.

BRIEF DESCRIPTION OF DRAWINGS

FIG. 1 Longitudinal section view showing an example of a mechanical seal that pertains to an example of the present invention.

FIG. 2 Drawing showing the sealing face of a sliding part that pertains to Example 1 of the present invention.

FIG. 3 (a) is a drawing explaining a positive-pressure generation mechanism constituted by a narrowing gap (step) on the downstream side of a dimple, while (b) is a drawing explaining a negative-pressure generation mechanism constituted by an expanding gap (step) on the upstream side of a dimple.

FIG. 4 Drawing showing the sealing face of a sliding component that pertains to Example 2 of the present invention.

FIG. 5 Drawing showing the sealing face of a sliding part that pertains to Example 3 of the present invention.

FIG. 6 Drawing showing the sealing face of a sliding part that pertains to Example 4 of the present invention.

FIG. 7 Drawing showing the sealing face of a sliding part that pertains to Example 5 of the present invention.

FIG. 8 Drawing explaining a streak-like flow of fluid due to cavitation occurring in a dimple or other concaved part formed on the sealing face.

FIG. 9 Drawing explaining how the direction of the streak-like flow of fluid in the area of cavitation occurring in a dimple formed on the sealing face changes when grooves with directionality are provided at the bottom of the dimple.

FIG. 10 Drawing showing the sealing face of a sliding part that pertains to Example 6 of the present invention.

FIG. 11 Drawing showing the sealing face of a sliding part that pertains to Example 7 of the present invention.

FIG. 12 Drawing showing the sealing face of a sliding part that pertains to Example 8 of the present invention.

FIG. 13 Drawing showing the sealing face of a sliding part that pertains to Example 9 of the present invention.

FIG. 14 Drawing showing the sealing face of a sliding part that pertains to Example 10 of the present invention.

FIG. 15 Drawing showing the sealing face of a sliding part that pertains to Example 11 of the present invention.

FIG. 16 Drawing showing the sealing face in a first modified Example of the sliding part that pertains to Example 11 of the present invention.

FIG. 17 Drawing showing the sealing face in a second modified Example of the sliding part that pertains to Example 11 of the present invention.

FIG. 18 Drawing showing the sealing face of a sliding part that pertains to Example 12 of the present invention.

FIG. 19 Drawing showing the sealing face in a first modified Example of the sliding part that pertains to Example 12 of the present invention.

FIG. 20 Drawing showing the sealing face in a second modified Example of the sliding part that pertains to Example 12 of the present invention.

DESCRIPTION OF EMBODIMENTS

Modes for carrying out the present invention are explained below based on examples. It should be noted, however, that, unless otherwise specified expressly, the dimensions, materials, shapes and relative arrangements, among others, of the components described in these examples do not intend to limit the scope of the present invention to these dimensions, materials, shapes and relative arrangements, etc.

Example 1

The sliding part pertaining to Example 1 of the present invention is explained by referring to FIGS. 1 to 3.

It should be noted that, in this example, the sliding part represents a part that constitutes a mechanical seal.

FIG. 1 is a longitudinal section view showing an example of a mechanical seal, where the mechanical seal is of the inside type that seals the fluid on the high-pressure fluid side that tends to flow in the direction from the outer periphery to inner periphery of the sealing face, comprising: an annular rotating ring 3 provided, on a rotational axis 1 that drives a pump impeller (not illustrated) on the high-pressure fluid side, via a sleeve 2 in a manner rotatable integrally with the rotational axis 1; and an annular stationary ring 5 provided on a housing 4 of the pump in a manner not rotatable but movable in the axial direction; with the two rings sliding relatively in a manner contacting each other via their sealing faces S that have been mirror-surface-finished by lapping, etc., by means of a coiled wave spring 6 and bellows 7 biasing the stationary ring 5 in the axial direction. In other words, this mechanical seal prevents outflow of the sealed fluid toward the atmosphere side from the outer periphery of the rotational shaft 1, using the sealing faces S of the rotating ring 3 and stationary ring 5.

It goes without saying that the present invention applies not only to mechanical seals of the inside type, but also to mechanical seals of the outside type where the sealed fluid on the high-pressure fluid side that tends to leak from the inner periphery toward the outer periphery of the sealing face is sealed.

FIG. 2 shows the sealing faces of sliding parts pertaining to Example 1 of the present invention, explaining examples where a dimple is formed on the sealing face of the stationary ring 5 in FIG. 1.

The same applies when a dimple is formed on the sealing face of the rotating ring 3.

In FIG. 2, multiple dimples 10 are provided on the sealing face S in the circumferential direction. The dimples 10 do not communicate with the high-pressure fluid side or low-pressure fluid side and the respective dimples 10 are provided independent of one another with a space in between in the circumferential direction. While the number, area, and depth of dimples 10 are determined as deemed appropriate according to the diameter of the sliding part, width, and relative speed of travel of the sealing face, as well as sealing and lubrication conditions, etc., preferably the dimples have a large area and are shallow from the viewpoint of fluid lubrication action and formation of fluid film.

The respective dimples 10 are positioned closer to the low-pressure fluid side in a cavitation formation area 10a on the upstream side, and closer to the high-pressure fluid side in a positive-pressure generation area 10b on the downstream side, and shaped in such a way that these two areas communicate with each other, where the fluid suctioned in the cavitation formation area 10a of each dimple 10 travels in the dimple, generates dynamic pressure (positive pressure) in the positive-pressure generation area 10b and is returned to the high-pressure fluid side which is closer in the radial direction.

With the dimples 10 shown in FIG. 2, the cavitation formation area 10a on the upstream side and positive-pressure generation area 10b on the downstream side each extend at a constant width in the circumferential direction in an arcing pattern, and the cavitation formation area 10a integrally communicates with the positive-pressure generation area 10b on the downstream side in the radial direction to form a crank shape, while the length of the cavitation formation area 10a in the circumferential direction is longer than the length of the positive-pressure generation area 10b in the circumferential direction. With the dimples 10 in FIG. 2, where the length of the cavitation formation area 10a in the circumferential direction is longer than the length of the positive-pressure generation area 10b in the circumferential direction, more fluid is suctioned in and leakage is prevented more effectively.

The shape of the dimples 10 shown in FIG. 2 is only one example and essentially it only requires that the cavitation formation area 10a on the upstream side be positioned closer to the low-pressure fluid side and the positive-pressure generation area 10b on the downstream side be positioned closer to the high-pressure fluid side, and, for example, rectangular, oval or other dimples can be positioned at an angle.

In this example, the fluid that has been suctioned in the cavitation formation area 10a positioned closer to the low-pressure fluid side of each dimple 10 travels in the dimple, generates dynamic pressure (positive pressure) in the positive-pressure generation area 10b positioned closer to the high-pressure fluid side on the downstream side, and is returned to the high-pressure fluid side which is closer in the radial direction, and accordingly the leakage of the sealed fluid on the high-pressure fluid side to the low-pressure fluid side can be prevented, while a fluid lubrication film is formed on the sealing face due to the positive pressure generated in the positive-pressure generation area 10b to achieve lubrication on the sealing face.

Now, the positive-pressure generation mechanism and negative-pressure generation mechanism are explained by referring to FIG. 3 under the assumption that dimples conforming to the present invention are provided.

In FIG. 3 (a), the rotating ring 3 moves in a rotational manner relative to the stationary ring 5 in the counterclockwise direction, as shown by the arrow, but if dimple 10 is formed on the sealing face S of the stationary ring 5, a narrowing gap (step) 11 exists on the downstream side of the dimple 10. The sealing face of the mating rotating ring 3 is flat.

As the rotating ring 3 moves relatively in the direction shown by the arrow, the fluid present between the sealing faces of the rotating ring 3 and stationary ring 5 tends, because of its viscous property, to follow the rotating ring 3 by moving in the moving direction of the rotating ring 3, and when this occurs, the dynamic pressure (positive pressure) shown by the broken line generates due to the presence of the narrowing gap (step) 11.

In FIG. 3 (b), the rotating ring 3 moves in a rotational manner relative to the stationary ring 5 in the counterclockwise direction, as shown by the arrow, but when dimple 10 is formed on the sealing face S of the stationary ring 5, an expanding gap (step) 12 exists on the upstream side of the dimple 10. The sealing face of the mating rotating ring 3 is flat.

As the rotating ring 3 moves relatively in the direction shown by the arrow, the fluid present between the sealing faces of the rotating ring 3 and stationary ring 5 tends, because of its viscous property, to follow the rotating ring 3 by moving in the moving direction of the rotating ring 3, and when this occurs, the dynamic pressure (negative pressure) shown by the broken line generates due to the presence of the expanding gap (step) 12.

Accordingly, negative pressure generates on the upstream side of the dimple 10, while positive pressure generates on the downstream side, and cavitation occurs in the negative-pressure generation area on the upstream side.

Example 2

FIG. 4 shows the sealing face of a sliding part that pertains to Example 2 of the present invention. This example is explained by assuming that dimples are formed on the sealing face of the stationary ring 5 in FIG. 1. Since Example 2 is the same as Example 1 in all aspects except that the position relationship of dimples in the circumferential direction is different from that in Example 1, the same members are denoted by the same symbols and duplicate explanations are omitted.

In FIG. 4, the dimples 10 arranged adjacent to each other in the circumferential direction are provided in such a way that the positive-pressure generation area 10b of the dimple 10 positioned on the upstream side overlaps, in the radial direction, with the cavitation formation area 10a of the dimple 10 positioned on the downstream side.

When dynamic pressure (positive pressure) generates in the positive-pressure generation area 10b of the dimple 10 positioned on the upstream side, the fluid is primarily returned to the high-pressure fluid side which is closer to the positive-pressure generation area 10b, but some fluid tends to leak to the low-pressure fluid side. However, because the cavitation formation area 10a of the dimple 10 on the downstream side is provided on the low-pressure fluid side of the positive-pressure generation area 10b, the fluid that tends to leak to the low-pressure fluid side is suctioned into the cavitation formation area 10a and therefore prevented from leaking to the low-pressure fluid side.

In this example, the effect of preventing leakage is greater than the effect achieved in Example 1.

Example 3

FIG. 5 shows the sealing face of a sliding part that pertains to Example 3 of the present invention. This example is explained by assuming that dimples are formed on the sealing face of the stationary ring 5 in FIG. 1. Since Example 3 is the same as Example 2 in all aspects except that the positive-pressure generation area communicates with the high-pressure fluid side, the same members are denoted by the same symbols and duplicate explanations are omitted.

In FIG. 5, the positive-pressure generation area 10b of each dimple communicates with the high-pressure fluid side via a continuous groove 13 whose depth is equal to or greater than the depth of the dimple 10. In FIG. 5, the continuous groove 13 is provided on the outer side in the radial direction with respect to the part where the cavitation formation area 10a and positive-pressure generation area 10b communicate with each other in the radial direction, but the arrangement is not limited to the foregoing and the groove only needs to be provided in such a way that the fluid on the high-pressure fluid side is taken into the positive-pressure generation area 10b.

In this example, fluid is taken into the positive-pressure generation area 10b not only from the cavitation formation area 10a, but also from the high-pressure fluid side, which augments the lubrication action further.

Example 4

FIG. 6 shows the sealing face of a sliding part that pertains to Example 4 of the present invention. This example is explained by assuming that dimples are formed on the sealing face of the stationary ring 5 in FIG. 1. The sliding part of Example 4 is suitable for applications where the sliding part on the rotating side rotates in both forward and reverse directions.

FIG. 6 shows the sealing face of the stationary ring 5 when, of the pair of sliding parts, the sliding part on the rotating side, or specifically the rotating ring 3, rotates in both forward and reverse directions, where respective dimples 15 are provided in such a way that two cavitation formation areas 15*a*, 15*a*' and two positive-pressure generation areas 15*b*, 15*b*' lie symmetrical with each other, respectively, relative to a radius line 0-0 connecting the center of each dimple in the circumferential direction and the center of rotation, while the cavitation formation areas 15*a*, 15*a*' closer to the low-pressure fluid side communicate with the positive-pressure generation areas 15*b*, 15*b*' closer to the high-pressure fluid side in the radial direction. Additionally, the lengths of the cavitation formation areas 15*a*, 15*a*' in the circumferential direction are longer than the lengths of the positive-pressure generation areas 15*b*, 15*b*' in the circumferential direction.

In FIG. 6, the mating sealing face rotates in the counterclockwise direction as indicated by the solid arrow, and the fluid that has been suctioned in the cavitation formation area 15*a* on the upstream side generates positive pressure in the positive-pressure generation area 15*b* on the downstream side; but when the mating sealing face rotates in the clockwise direction as indicated by the broken arrow, the fluid that has been suctioned in the cavitation formation area 15*a*' on the upstream side corresponding to the opposite side of the line 0-0 generates positive pressure in the positive-pressure generation area 15*b*' on the downstream side, and accordingly, the stationary ring 5 need not be replaced even when the rotating ring 3 rotates in both forward and reverse directions.

Example 5

FIG. 7 shows the sealing face of a sliding part that pertains to Example 5 of the present invention, and since this example is the same as Example 4 in all aspects except that the positive-pressure generation area communicates with the high-pressure fluid side, the same members are denoted by the same symbols and duplicate explanations are omitted.

FIG. 7 shows that, of a pair of sliding parts where the sliding part on the rotating side, or specifically the rotating ring 3, rotates in both forward and reverse directions, the stationary ring 5 has a continuous groove 16 through which the positive-pressure generation areas 15*b*, 15*b*' communicate with the high-pressure fluid side and the continuous groove 16 is provided symmetrically across a radius line 0-0 connecting the center of the dimple 15 in the circumferential direction and the center of rotation.

In FIG. 7, fluid is taken into the positive-pressure generation area 15*b* or 15*b*' not only from the cavitation formation area 15*a* or 15*a*', but also from the high-pressure fluid side, which certainly augments the lubrication action and also eliminates the need to replace the stationary ring 5 when the mating sealing face rotates in the counterclockwise direction as indicated by the solid arrow or in the clockwise direction as indicated by the broken arrow.

Next, cavitation occurring in the dimple and flow control of fluid in the cavitation area are explained.

It is known that, in the case of a general mechanical seal where the sealing faces of two parts are each constituted by a smooth plane, not only a film by the sealed fluid, but also a phase due to cavitation occurring in the fluid, are formed between the sealing faces (refer to Hamilton, Walowit, Allen: A.S.M.E. Paper No. 65-Lub-11 (1965)). In other words, a phase constituted by liquid (sealed fluid) (hereinafter referred to as "liquid phase") and another phase constituted by gas (hereinafter referred to as "gas phase") are formed between the sealing faces.

Also, as shown in FIG. 8, it is generally known that a streak-like flow of fluid 20 due to cavitation generates in a dimple or other concaved part 10 formed on the sealing face S.

The inventors of the present invention gained the knowledge during the course of researching the fluid lubrication action of dimples on the sealing face of a mechanical seal, etc., that, by setting grooves 30 with directionality at the bottom of a dimple formed on the sealing face, the direction of the streak-like flow of fluid 20 that generates in the area of cavitation occurring in the dimple 10 can be changed or controlled, as illustrated in FIG. 9. This is probably explained by the fact that the cavitation is internally filled with gas whose viscosity is sufficiently low compared to that of liquid, and the resulting good fluidity keeps the pressure in the cavitation constant, which in turn acts to control the streak-like flow in the cavitation regardless of the differential pressure between the inner periphery and outer periphery of the sealing face.

In other words, when the grooves 30 with directionality are present at the bottom of the dimple 10, edges 40 of the grooves 30 act upon the gas-liquid interface as geometrical barriers to prevent the movement of the streak-like flow of fluid 20 to pass over the grooves 30, and as a result, the streak-like flow of fluid 20 moves to a certain degree along the edges 40 of the grooves 30 and consequently the streak-like flow inside the cavitation is controlled.

The geometrical barrier action of the edges is described in detail in Japanese Patent Laid-open No. 2011-185292, which is an application for patent filed by the applicant of the present invention.

Example 6

FIG. 10 shows the sealing face of a sliding part that pertains to Example 6 of the present invention, and this example is explained by assuming that dimples are formed on the sealing face of the stationary ring 5 in FIG. 1. Since Example 6 is the same as Example 2 shown in FIG. 4 in all aspects except that grooves with directionality are formed in the cavitation formation area, the same members are denoted by the same symbols and duplicate explanations are omitted.

In FIG. 10, grooves 30 with directionality are provided in the cavitation formation area 10*a* of each dimple 10. The grooves 30 with directionality may be provided over the entire cavitation formation area 10*a* or in some parts thereof. Furthermore, the grooves 30 with directionality are formed at the bottom of the dimple 10 and their width and depth are not specifically limited, so long as the edges of the grooves 30 with directionality act upon the gas-liquid interface as geometrical barriers to prevent the movement of the streak-like flow of fluid to pass over the grooves 30 with directionality, as explained earlier.

In addition, the directionality of grooves 30 is determined by how the fluid should be controlled and, in FIG. 10, they are inclined in the counterclockwise direction from the inner diameter side toward the outer diameter side so as to move the fluid in the cavitation formation area 10*a* to the positive-pressure generation area 10*b*. As explained earlier, the cavitation is internally filled with gas whose viscosity is sufficiently small compared to that of liquid, and the resulting good fluidity keeps the pressure in the cavitation constant, which in turn acts to control the streak-like flow of fluid regardless of the differential pressure between the inner periphery and outer periphery of the sealing face S, and therefore when the grooves 30 have the directionality as shown in FIG. 10, the grooves 30 provided in the cavitation formation area 10a cause the streak-like flow of fluid in the cavitation formation area 10a to move to a certain degree along the edges of the first groove 30 on the upstream side, and then move to a certain degree along the edges of the second groove 30, and as this is repeated in succession, the fluid is controlled in a manner moving to the positive-pressure generation area 10b.

The pitch p of the grooves 30 with directionality only needs to be set to an optimal value from design viewpoints and is not limited in any way.

In this example, the fluid that has been suctioned in the cavitation formation area 10a positioned closer to the low-pressure fluid side of each dimple 10 travels in the dimple, generates dynamic pressure (positive pressure) in the positive-pressure generation area 10b positioned closer to the high-pressure fluid side on the downstream side, and is returned to the high-pressure fluid side which is closer in the radial direction, and accordingly the leakage of the sealed fluid on the high-pressure fluid side to the low-pressure fluid side can be prevented, while a fluid lubrication film is formed on the sealing face due to the positive pressure generated in the positive-pressure generation area 10b to achieve lubrication on the sealing face, and furthermore the grooves 30 with directionality provided in the cavitation formation area 10a control the streak-like flow of fluid in the cavitation formation area 10a to move to the positive-pressure generation area 10b, and consequently leakage of fluid is further prevented.

Example 7

FIG. 11 shows the sealing face of a sliding part that pertains to Example 7 of the present invention, and this example is explained by assuming that dimples are formed on the sealing face of the stationary ring 5 in FIG. 1. Since Example 7 is the same as Example 6 shown in FIG. 10 in all aspects except that the positive-pressure generation area communicates with the high-pressure fluid side, the same members are denoted by the same symbols and duplicate explanations are omitted.

In FIG. 11, the positive-pressure generation area 10b of each dimple communicates with the high-pressure fluid side via a continuous groove 13 whose depth is equal to or greater than the depth of the dimple 10. In FIG. 11, the continuous groove 13 is provided on the outer side in the radial direction with respect to the part where the cavitation formation area 10a and positive-pressure generation area 10b communicate with each other in the radial direction, but the arrangement is not limited to the foregoing and the groove only needs to be provided in such a way that the fluid on the high-pressure fluid side is taken into the positive-pressure generation area 10b.

In this example, fluid is taken into the positive-pressure generation area 10b not only from the cavitation formation area 10a, but also from the high-pressure fluid side, which augments the lubrication action further.

Example 8

FIG. 12 shows the sealing face of a sliding part that pertains to Example 8 of the present invention, and this example is explained by assuming that dimples are formed on the sealing face of the stationary ring 5 in FIG. 1. Since Example 8 is the same as Example 6 shown in FIG. 10 in all aspects except that grooves with directionality are formed in some parts of the cavitation formation area, the same members are denoted by the same symbols and duplicate explanations are omitted.

As shown in FIG. 12, grooves 30 with directionality are provided only on the low-pressure fluid side of the cavitation formation area 10a. While in FIG. 10 the control of the streak-like flow of fluid by the grooves 30 with directionality occurs over the entire cavitation formation area 10a in the radial direction from the low-pressure fluid side to the high-pressure fluid side, in FIG. 12 the control of the streak-like flow of fluid by the grooves 30 with directionality occurs on the low-pressure fluid side of the cavitation formation area 10a. When the differential pressure between the low-pressure fluid side and high-pressure fluid side is large, ideally grooves 30 with directionality like those shown in FIG. 10 are provided over the entire area in the radial direction from the low-pressure fluid side to the high-pressure fluid side, but when the differential pressure between the low-pressure fluid side and high-pressure fluid side is small, leakage can also be prevented even if grooves 30 with directionality like those shown in FIG. 12 are provided only on the low-pressure fluid side.

It should be noted that, besides only on the low-pressure fluid side, the grooves 30 with directionality may be provided only on the high-pressure fluid side or only at the center in the radial direction, which means that, in essence, the area or areas where the grooves 30 with directionality are to be provided can be selected as deemed appropriate according to the level of differential pressure, etc.

Example 9

FIG. 13 shows the sealing face of a sliding part that pertains to Example 9 of the present invention, and this example is explained by assuming that dimples are formed on the sealing face of the stationary ring 5 in FIG. 1. Since Example 9 is the same as Example 8 shown in FIG. 12 in all aspects except that the positive-pressure generation area communicates with the high-pressure fluid side, the same members are denoted by the same symbols and duplicate explanations are omitted.

In FIG. 13, the positive-pressure generation area 10b of each dimple communicates with the high-pressure fluid side via a continuous groove 13 whose depth is equal to or greater than the depth of the dimple 10. In FIG. 13, the continuous groove 13 is provided on the outer side in the radial direction with respect to the part where the cavitation formation area 10a and positive-pressure generation area 10b communicate with each other in the radial direction, but the arrangement is not limited to the foregoing and the groove only needs to be provided in such a way that the fluid on the high-pressure fluid side is taken into the positive-pressure generation area 10b.

In this example, fluid is taken into the positive-pressure generation area 10b not only from the cavitation formation area 10a, but also from the high-pressure fluid side, which augments the lubrication action further.

Example 10

FIG. 14 shows the sealing face of a sliding part that pertains to Example 10 of the present invention, and this example is explained by assuming that dimples are formed on the sealing face of the stationary ring 5 in FIG. 1. Since Example 10 is the same as Example 5 shown in FIG. 7 in all aspects except that the sliding part is suitable for applications where the sliding part on the rotating side rotates in both forward and reverse directions and that grooves are formed in the cavitation formation area, the same members are denoted by the same symbols and duplicate explanations are omitted.

In FIG. 14, grooves 30, 30' with directionality are provided in the cavitation formation areas 15a, 15a' of the respective dimples 15. The grooves 30 may be provided over the entire cavitation formation areas 15a, 15a' or in some parts thereof. Furthermore, the grooves 30 are formed at the bottom of the dimple 15 and their width and depth are not specifically limited, so long as the edges of the grooves 15 act upon the gas-liquid interface as geometrical barriers to prevent the movement of the streak-like flow of fluid to pass over the grooves 30, as explained earlier.

In FIG. 14, the mating sealing face rotates in the counterclockwise direction as indicated by the solid arrow, and the fluid that has been suctioned in the cavitation formation area 15a on the upstream side is controlled using the grooves 30 to flow toward the high-pressure fluid side while moving to the positive-pressure generation area 15b on the downstream side. On the other hand, if the mating sealing face rotates in the clockwise direction as indicated by the broken arrow, the fluid that has been suctioned in the cavitation formation area 15a' on the upstream side corresponding to the opposite side of the line 0-0 is controlled using the grooves 30' to flow toward the high-pressure fluid side while moving to the positive-pressure generation area 15b' on the downstream side, and accordingly the stationary ring 5 need not be replaced even when the rotating ring 3 rotates in both forward and reverse directions.

Example 11

FIGS. 15 to 17 show the sealing faces of sliding parts that pertain to Example 11 of the present invention, and this example is explained by assuming that dimples are formed on the sealing face of the stationary ring 5 in FIG. 1. Since Example 11 is basically the same as Example 1 shown in FIG. 2 in all aspects except that positive-pressure generation mechanisms each constituted by a Rayleigh step are provided on the high-pressure fluid side of the sealing face on which the dimples are provided, the same members are denoted by the same symbols and duplicate explanations are omitted.

In FIG. 15, dimples 10 are provided on the low-pressure fluid side of the sealing face S, and positive-pressure generation mechanisms each constituted by a Rayleigh step 26 are provided on the high-pressure fluid side.

For the dimples on the low-pressure fluid side, the dimples in Example 2 as shown in FIG. 4 can be adopted.

The Rayleigh step 26 is constituted by a narrowing step 29, groove 28 on the upstream side, and radius-direction groove 25 communicating with the high-pressure fluid side, and a pressure-release groove 27 communicating with the high-pressure fluid side via the radius-direction groove 25 is provided between the Rayleigh step 26 and dimple 10. The pressure-release groove 27 is intended to release the dynamic pressure (positive pressure) generating in the Rayleigh step 26 until reaching the pressure of the fluid on the high-pressure fluid side so as to prevent the fluid from flowing into the dimple 10 on the low-pressure fluid side and thereby weakening negative-pressure generation capacity of the dimple 10, where the positive pressure generating in the Rayleigh step 26 on the high-pressure fluid side guides the fluid that tends to flow into the low-pressure fluid side, to the pressure-release groove 27 to be released to the high-pressure fluid side.

The depths and widths of the groove 28, radius-direction groove 25, and pressure-release groove 27 are determined as deemed appropriate according to the diameter of the sliding part, width, and relative speed of travel of the sealing face, as well as sealing and lubrication conditions, etc. For example, the depth of the groove 28 is several times the depth of the dimple 10, while the depths of the radius-direction groove 25 and pressure-release groove 27 are at least ten times the depth of the dimple 10.

In this example, a fluid film is formed for lubrication by the positive-pressure generation mechanism constituted by the Rayleigh step 26 provided on the high-pressure fluid side, while the dimple 10 provided on the low-pressure fluid side is used for sealing and lubrication, and the fluid that has been suctioned in the cavitation formation area 10a of the dimple 10 is guided from the positive-pressure generation area 10b to the pressure-release groove 27 and returned to the high-pressure fluid side via the radius-direction groove 25. This way, in this example, the sliding component that lubricates by forming a fluid film via the positive-pressure generation mechanism constituted by the Rayleigh step provided on the high-pressure fluid side, while sealing and lubricating by means of the dimple provided on the low-pressure fluid side, makes the sealing action of the dimple reliable.

First Modified Example

FIG. 16 is the same as FIG. 15 in all aspects except that the shape of the dimple 10 is slightly different from that in FIG. 15, so duplicate explanations are omitted.

With the dimple 10 shown in FIG. 16, the cavitation formation area 10a on the upstream side and positive-pressure generation area 10b on the downstream side each extend at a constant width in the circumferential direction in an arcing pattern, and the cavitation formation area 10a integrally communicates with the positive-pressure generation area 10b on the downstream side in the radial direction to form a crank shape, while the length of the cavitation formation area 10a in the circumferential direction is longer than the length of the positive-pressure generation area 10b in the circumferential direction, all of which are the same as with the dimple in FIG. 15, but the dimple 10 shown in FIG. 16 is such that the part that integrally connects the cavitation formation area 10a with the positive-pressure generation area 10b on the downstream side from the inner diameter side toward the outer diameter side inclines toward the rotating direction of the mating sealing face. This increases the effect of pumping to the positive-pressure generation area 10b the fluid that has been suctioned in the cavitation formation area 10a, and the pumping function is reinforced as a result.

Second Modified Example

FIG. 17 is the same as FIG. 16 in all aspects except that the shape of the dimple 10 is slightly different from that in FIG. 16, so duplicate explanations are omitted.

With the dimple 10 shown in FIG. 17, the part that integrally connects the cavitation formation area 10a with the positive-pressure generation area 10b on the downstream side from the inner diameter side toward the outer diameter side inclines toward the rotating direction of the mating sealing face, which is the same as with the dimple 10 in FIG. 16, but the dimple 10 shown in FIG. 17 is such that the cavitation formation area 10a, positive-pressure generation area 10b, and part integrally connecting the two and inclining toward the radial direction, are formed in a smooth arcing pattern. This not only reinforces the function to pump to the positive-pressure generation area 10b the fluid that has been suctioned in the cavitation formation area 10a, but it also makes the flow of fluid smooth.

It should be noted that the shapes of the dimples 10 shown in FIGS. 16 and 17 can certainly be applied to Example 1 in FIG. 2, Example 4 in FIG. 4, Example 3 in FIG. 5, Example 6 in FIG. 10, Example 7 in FIG. 11, Example 8 in FIG. 12, and Example 9 in FIG. 13.

Example 12

FIGS. 18 to 20 show the sealing faces of sliding components that pertain to Example 12 of the present invention, and this example is explained by assuming that dimples are formed on the sealing face of the stationary ring 5 in FIG. 1. Since Example 12 is the same as Example 11 shown in FIGS. 15 to 17 in all aspects except that the sliding component is suitable for applications where the sliding part on the rotating side rotates in both forward and reverse directions, which is different from Example 11 in FIGS. 15 to 17 that can be applied only to a single rotating direction, the same members are denoted by the same symbols and duplicate explanations are omitted.

FIG. 18 shows the sealing face of the stationary ring 5 when, of the pair of sliding parts, the sliding part on the rotating side, or specifically the rotating ring 3, rotates in both forward and reverse directions, where the dimples provided on the low-pressure fluid side are such that cavitation formation areas 17a, 17a' and positive-pressure generation areas 17b, 17b' lie symmetrical with each other, respectively, relative to a radius-direction line 0-0 connecting the center of each dimple 17 in the circumferential direction and the center of rotation. To be specific, with respect to the respective dimples 17 the cavitation formation areas 17a, 17a' closer to the low-pressure fluid side are provided closer to the radius line 0-0 and symmetrically with each other across the radius line 0-0, while the positive-pressure generation areas 17b, 17b' closer to the high-pressure fluid side are provided away from the radius line 0-0 and symmetrically with each other across the radius line 0-0, and the cavitation formation area 17a on the upstream side communicates with the positive-pressure generation area 17b' during rotation in the reverse direction, while the cavitation formation area 17a' on the downstream side during rotation in the reverse direction communicates with the positive-pressure generation area 17b, in the radial direction. Additionally, the lengths of the cavitation formation areas 17a, 17a' in the circumferential direction are longer than the lengths of the positive-pressure generation areas 17b, 17b' in the circumferential direction.

For the dimples provided on the low-pressure fluid side, the dimples in Example 4 as shown in FIG. 6 can be adopted.

As for the positive-pressure generation mechanisms each constituted by the Rayleigh step provided on the high-pressure fluid side of the sealing face S, of the multiple radius-direction grooves 25 communicating with the high-pressure fluid side, a groove 28 and narrowing step 29 forming the Rayleigh step 26 are provided on the downstream side, while a groove 28' and narrowing step 29' forming the Rayleigh step 26' are provided on the upstream side (or downstream side if the rotating direction is reverse), of every other radius-direction groove 25 in the circumferential direction. Symbol 27 represents the pressure-release groove.

In FIG. 18, the mating sealing face rotates in the counterclockwise direction as indicated by the solid arrow, and the fluid that has been suctioned in the cavitation formation area 17a on the upstream side generates positive pressure in the positive-pressure generation area 17b on the downstream side; but when the mating sealing face rotates in the clockwise direction as indicated by the broken arrow, the fluid that has been suctioned in the cavitation formation area 17a' on the opposite side of the line 0-0 generates positive pressure in the positive-pressure generation area 17b'. At the same time, positive pressure is generated by the Rayleigh step 26 on the downstream side of the radius-direction groove 25 when the mating sealing face rotates in the counterclockwise direction as indicated by the solid arrow, while positive pressure is generated by the Rayleigh step 26' on the opposite side when the mating sealing face rotates in the clockwise direction as indicated by the broken arrow.

In this example, the sliding component that lubricates by forming a fluid film via the positive-pressure generation mechanism constituted by the Rayleigh step provided on the high-pressure fluid side, while sealing and lubricating by means of the dimple provided on the low-pressure fluid side, makes the sealing action of the dimple reliable and, in addition to this sealing benefit, the stationary ring 5 need not be replaced even when the rotating ring 3 rotates in both forward and reverse directions.

First Modified Example

FIG. 19 is the same as FIG. 18 in all aspects except that the shape of the dimple 17 and number of Rayleigh steps 26, 26' are slightly different from those in FIG. 18, so duplicate explanations are omitted.

The dimple 17 in FIG. 19 is the same as that in FIG. 18 in that the cavitation formation areas 17a, 17a' and positive-pressure generation areas 17b, 17b' lie symmetrical with each other, respectively, relative to a radius-direction line 0-0 connecting the center of each dimple 17 in the circumferential direction and the center of rotation, but the dimple 17 in FIG. 19 is such that the part that integrally connects the cavitation formation area 17a or 17a' with the positive-pressure generation area 17b or 17b' on the downstream side from the inner diameter side toward the outer diameter side inclines toward the rotating direction of the mating sealing face, and that the cavitation formation area 17a or 17a', positive-pressure generation area 17b or 17b', and part integrally connecting the two and inclining toward the radial direction, are formed in a smooth arcing pattern. This not only reinforces the function to pump to the positive-pressure generation area 17b or 17b' the fluid that has been suctioned in the cavitation formation area 17a or 17a', but it also makes the flow of fluid smooth.

Additionally, the Rayleigh steps 26, 26' are set in the same number as that of the dimples 17 and provided on the high-pressure fluid side corresponding to the positions of the respective dimples 17.

Second Modified Example

FIG. 20 is the same as FIG. 19 in all aspects except that the positive-pressure generation areas 17b, 17b' of the dimples 17 are positioned closer to the high-pressure fluid side of the sealing face S, so duplicate explanations are omitted.

In FIG. 20, the positive-pressure generation areas 17b, 17b' of the dimple 17 are positioned closer to the high-pressure fluid side of the sealing face S and therefore the respective Rayleigh steps 26, 26' have their length in the circumferential direction set shorter to correspond to the ranges of the cavitation formation areas 17a, 17a' of the dimple 17, while the pressure-release grooves 27 extend in a manner surrounding the low-pressure fluid side of the respective Rayleigh steps 26, 26' and communicate with the high-pressure fluid side at both ends. In the space between the Rayleigh steps 26, 26', the positive-pressure generation areas 17b, 17b' of the dimple 17 are provided in a manner extending to near the high-pressure fluid side. Accordingly, while the respective Rayleigh steps 26, 26' have the role of generating dynamic pressure (positive pressure) on the high-pressure fluid side within the ranges of the cavitation formation areas 17a, 17a' of the dimple 17, dynamic pressure (positive pressure) is generated by the positive-pressure generation areas 17b, 17b' of the dimple 17 outside the ranges of the cavitation formation areas 17a, 17a'.

The foregoing explained the examples of the present invention using the drawings, but specific constitutions of the present invention are not limited to these examples and other changes and additions are also included in the scope of the present invention so long as they do not deviate from the key points of the present invention.

For example, while the aforementioned examples explained using the sliding part as one of the pair of rotating seal ring and stationary seal ring in a mechanical seal device, but it is also possible to use it as a sliding component for a bearing that slides against a rotating axis with lubrication oil sealed on one side of its cylindrical sealing face in the axial direction.

In addition, the aforementioned examples explained situations where high-pressure fluid is sealed on the outer periphery side, for example, but the present invention can also be applied when high-pressure fluid is present on the inner periphery side, in which case it is only required that the cavitation formation area and positive-pressure generation area of the dimple be positioned on the outer periphery side and inner periphery side, respectively, and that, if grooves with directionality are provided, the grooves be provided in the reverse direction.

In addition, the aforementioned examples explained situations where the dimple is shaped to extend in the circumferential direction like a crank, for example, but the present invention is not limited to the foregoing and essentially it suffices that the cavitation formation area on the upstream side is positioned closer to the low-pressure fluid side and the positive-pressure generation area on the downstream side is formed closer to the high-pressure fluid side, and rectangular, oval, or other dimples can be positioned at an angle, for example.

In addition, while Examples 11 and 12 above explained situations where, of the rotating ring 3 and stationary ring 5, dimples 10 with pumping action and positive-pressure generation mechanisms each constituted by a Rayleigh step 26 are provided on the sealing face of the stationary ring 5, but the present invention is not limited to the foregoing and they may be provided on the sealing face of the rotating ring 3, or dimples 10 with pumping action may be provided on the sealing face of either the rotating ring 3 or stationary ring 5 and positive-pressure generation mechanisms each constituted by a Rayleigh step 26 may be provided on the other sealing face. For example, dimples 10 with pumping action may be provided on the sealing face of the rotating ring 3 and positive-pressure generation mechanisms each constituted by a Rayleigh step 26 may be provided on the sealing face of the stationary ring 5, in which case the sealing function and lubrication function can be improved further. Note that the radius-direction groove 25 and pressure-release groove 27 are provided on the side where the positive-pressure generation mechanism constituted by the Rayleigh step 26 is provided.

DESCRIPTION OF THE SYMBOLS

1 Rotational axis
2 Sleeve
3 Rotating ring
4 Housing
5 Stationary ring
6 Coiled wave spring
7 Bellows
10 Dimple
10a Cavitation formation area
10b Positive-pressure generation area
11 Narrowing gap (step)
12 Expanding gap (step)
13 Continuous groove
15 Dimple
15a, 15a' Cavitation formation area
15b, 15b' Positive-pressure generation area
16 Continuous groove
17 Dimple
17a, 17a' Cavitation formation area
17b, 17b' Positive-pressure generation area
20 Streak-like flow of fluid
25 Radius-direction groove
26, 26' Rayleigh step
27 Pressure-release groove
28, 28' Groove
29, 29' Narrowing step
30 Groove with directionality
40 Edge of groove with directionality

The invention claimed is:

1. A sliding component characterized in that dimples are provided on one sealing face of a pair of sliding parts that mutually slide relative to each other,
where a cavitation formation area on an upstream side of each dimple is positioned closer to a low-pressure fluid side and a positive-pressure generation area on a downstream side of the dimple is positioned closer to a high-pressure fluid side, wherein the cavitation formation area and the positive-pressure generation area are provided in the same dimple and communicate with one another,
the dimples do not communicate with the high-pressure fluid side, and the respective dimples do not communicate with one another, and
a fluid that has been suctioned in from the low-pressure fluid side of the cavitation formation area of each of the dimples travels in the dimple and is returned to the high-pressure fluid side from the positive-pressure generation area.

2. A sliding component according to claim 1, characterized in that, of the dimples adjacent to each other in a circumferential direction, the positive-pressure generation area of the dimple positioned on the upstream side is provided in a manner overlapping, in a radial direction, with the cavitation formation area of the dimple positioned on the downstream side.

3. A sliding component according to any one of claim 2, characterized in that grooves with directionality are provided in the cavitation formation area.

4. A sliding component according to claim 3, characterized in that the grooves with directionality are provided at least on the low-pressure fluid side of the cavitation formation area.

5. A sliding component according to claim 1, characterized in that, of the pair of sliding parts, the sliding part on a rotating side that rotates in both forward and reverse directions is such that the cavitation formation area and positive-pressure generation area are provided symmetrically with each other across a line drawn in a radial direction by connecting a center of the dimple in a circumferential direction and a center of rotation.

6. A sliding component according to any one of claim 5, characterized in that grooves with directionality are provided in the cavitation formation area.

7. A sliding component according to claim 6, characterized in that the grooves with directionality are provided at least on the low-pressure fluid side of the cavitation formation area.

8. A sliding component according to claim 1, characterized in that grooves with directionality are provided in the cavitation formation area.

9. A sliding component according to claim 8, characterized in that the grooves with directionality are provided at least on the low-pressure fluid side of the cavitation formation area.

10. A sliding component according to claim 1, wherein the dimples do not communicate with the low-pressure fluid side.

11. A sliding component according to claim 1, wherein the cavitation formation area is constituted by an inner groove extending along the circumferential direction, and the positive-pressure generation area is constituted by an outer groove extending along the circumferential direction, wherein a wall of the inner groove on the low-pressure fluid side is closer to the low-pressure side than is a wall of the outer groove on the low-pressure fluid side, and a wall of the outer groove on the high-pressure fluid side is closer to the high-pressure side than is a wall of the inner groove on the high-pressure fluid side.

* * * * *